US006859425B2

(12) United States Patent
Maegawa et al.

(10) Patent No.: US 6,859,425 B2
(45) Date of Patent: Feb. 22, 2005

(54) WOBBLE SIGNAL DETECTION CIRCUIT AND OPTICAL DISK DEVICE

(75) Inventors: Hiroshi Maegawa, Kanagawa (JP); Toshihiro Shigemori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 10/313,036

(22) Filed: Dec. 6, 2002

(65) Prior Publication Data
US 2003/0128641 A1 Jul. 10, 2003

(30) Foreign Application Priority Data
Dec. 7, 2001 (JP) ........................................ 2001-374057

(51) Int. Cl.⁷ ................................................. G11B 7/00
(52) U.S. Cl. ................ 369/47.3; 369/53.34; 369/59.14; 369/124.12
(58) Field of Search ............................. 369/47.15, 47.3, 369/47.34, 47.35, 47.23, 47.25, 47.48, 59.11, 59.14, 59.15, 53.34, 124.12

(56) References Cited

U.S. PATENT DOCUMENTS

| 5,222,057 A | 6/1993 | Suzuki et al. |
| 5,235,576 A | 8/1993 | Shigemori |
| 5,241,521 A | 8/1993 | Shigemori |

(List continued on next page.)

FOREIGN PATENT DOCUMENTS

| EP | 1184847 | 6/2002 | |
| JP | 04325926 A | * 11/1992 | ............ G11B/7/00 |
| JP | 05-282691 | 10/1993 | |
| JP | 07169078 | 7/1995 | |
| JP | 08185664 | 7/1996 | |
| JP | 8-194969 | 7/1996 | |
| JP | 11066578 | 3/1999 | |
| JP | 11-161982 | 6/1999 | |
| JP | 2001-093147 | 4/2001 | |
| JP | 2001-134943 | 5/2001 | |
| JP | 2001-093147 | 6/2001 | |
| JP | 2001-266486 | 9/2001 | |
| JP | 2002-074674 | 3/2002 | |
| JP | 2003-30878 | 1/2003 | |
| JP | 2003-059056 | 2/2003 | |
| WO | WO 03/034413 | 4/2003 | |

OTHER PUBLICATIONS

Patent Abstracts of Japan, vol. 1996, No. 11, & JP 08 194969A (Sony Corp), Jul. 30, 1996.
Patent Abstracts of Japan, vol. 2000, No. 07, Sep. 29, 2000 & JP 2000 113454 (Pioneer Electronic Corp), Apr. 21, 2000.
Patent Abstracts of Japan, vol. 2000, No. 14, Mar. 5, 2001 & JP 2000 331347 (Sony Corp), Nov. 30, 2000.
Patent Abstracts of Japan, vol. 2000, No. 10, Nov. 17, 2000 & JP 2000 195058 (Pioneer Electronic Corp), Jul. 14, 2000.

Primary Examiner—W. R. Young
Assistant Examiner—Jorge L Ortiz-Criado
(74) Attorney, Agent, or Firm—Dickstein Shapiro Morin & Oshinsky LLP

(57) ABSTRACT

An wobble signal detection circuit that is provided on an optical disk device and can detect a wobble signal having high accuracy and stability at least when recording information on an optical disk. This wobble signal detection circuit can be applied to plural types of optical recording media. With the wobble signal detection circuit, during a period for forming a space region, a first voltage signal provided from a first light receiving element is sampled and amplified to be a target voltage, a second voltage signal provided from a second light receiving element is sampled and amplified to be the target voltage. The difference between the two amplified signals are output as the wobble signal. The first and second light receiving elements are divided from each other in the direction tangential to a recording region on the optical recording medium.

24 Claims, 12 Drawing Sheets

U.S. PATENT DOCUMENTS

| | | |
|---|---|---|
| 5,438,601 A | 8/1995 | Maegawa et al. |
| 5,602,823 A | 2/1997 | Aoki et al. |
| 5,648,952 A | 7/1997 | Maegawa et al. |
| 5,663,941 A | 9/1997 | Aoshima |
| 5,703,776 A | 12/1997 | Soung |
| 5,717,679 A | 2/1998 | Mashimo et al. |
| 5,745,463 A | 4/1998 | Maegawa et al. |
| 5,764,610 A | 6/1998 | Yoshida et al. |
| 5,828,634 A | 10/1998 | Ohno et al. |
| 5,956,313 A | 9/1999 | Maegawa et al. |
| 6,061,313 A | 5/2000 | Shigemori |
| 6,088,307 A | 7/2000 | Fushimi et al. |
| 6,125,089 A | 9/2000 | Shigemori |
| 6,160,773 A | 12/2000 | Maegawa et al. |
| 6,345,018 B1 | 2/2002 | Maegawa et al. |
| 6,400,673 B1 | 6/2002 | Shigemori |
| 6,487,149 B1 | 11/2002 | Yokoi et al. |
| 6,556,523 B1 | 4/2003 | Masui |
| 2001/0005354 A1 | 6/2001 | Maegawa |
| 2002/0024897 A1 | 2/2002 | Nakajima |
| 2002/0136126 A1 | 9/2002 | Maegawa |
| 2003/0021217 A1 | 1/2003 | Kim et al. |
| 2003/0072231 A1 | 4/2003 | Matsui |
| 2003/0099172 A1 | 5/2003 | Park et al. |
| 2003/0099180 A1 | 5/2003 | Park et al. |

\* cited by examiner

WOBBLE SIGNAL DETECTION CIRCUIT AND OPTICAL DISK DEVICE

BACKGROUND OF THE INVENTION

1. Field of the Invention

The present invention relates to a wobble signal detection circuit and an optical disk device. More specifically, the present invention relates to a wobble signal detection circuit for detecting a wobble signal recorded on an optical recording medium such as a CD (compact disk), a DVD (digital video disk), a DVR+R (DVD+recordable), and a DVD+ rewritable), and relates to a disk device including this wobble signal detection circuit.

2. Description of the Related Art

An information recording/reproducing device (for example, an optical disk device) for recording information on an optical disk that is an optical recording medium having a spiral recording region, and reproducing information recorded on an optical disk, by using laser light emitted from an optical pickup of the information recording/reproducing device has been put to practical use.

Recently improved functions of a personal computer enabled the personal computer to process audio and visual information such as music and an image. Since an information amount of the audio and visual information is substantially large, an optical disk is considered as an important information recording medium. The price of the optical disk became cheap, and an optical disk device has prevailed as peripheral equipment of the personal computer.

Generally, a groove referred to as a track (pre-groove) is provided in advance on recording regions of a write-once optical disk such as the DVD+R and a rewritable optical disk such as the DVD+RW. Furthermore, a wobble is provided to this track in order to record various additional information as a wobble signal.

Of the additional information, ADIP (ADress In Pregroove) information is the most important. The ADIP information includes address information indicating a position on the optical disk. The address information is necessary for accurately controlling the position of the optical pickup when recording or reproducing is performed. The ADIP information further includes information that synchronizes with a rotational speed of the optical disk so that information can be accurately recorded at a predetermined position on the optical disk.

If the ADIP information cannot be accurately detected, the optical disk device cannot perform an operation that synchronizes with the rotation of the optical disk, and a recording error can occur. Particularly, in the case of the write-once optical disk, if the recording error is generated on the optical disk, this optical disk cannot be reused. For this reason, it is substantially important to accurately detect the ADIP information, i.e., the wobble signal.

The light reflected from the track of the optical disk includes the wobble signal. The reflected light, however, includes noises caused by changes of data having been recorded on the optical disk or changes of the laser light power. In the conventional manner that treats this problem, two light receiving elements that are divided from each other in a direction tangential to the tack receive the reflected light from the track. The difference between the signals (electric signals converted from light signals) output from the two light receiving elements is obtained in order to remove the noise component to extract the wobble signal. Before the shipment of the optical disk device, the attached position of the two light receiving elements is adjusted such that the reflected light from the track is received at the centers of the receiving surfaces of the two light receiving elements. However, the position at which the reflected light is received can be shifted from the centers of the receiving surfaces of the two light receiving elements due to position changes with time or age caused by temperature changes or vibrations during the operation of the optical disk device. In this case, since the noise components included in the signals output from the two light receiving elements are different from each other due to the positional changes, even if the difference between the signals output from the two light receiving elements is obtained, a certain amount of the noise component remains. Accordingly, the signal-to-noise ratio of the wobble signal decreases, and it becomes difficult to accurately detect the wobble signal.

In order to deal with this problem, according to an optical disk device disclosed in Japanese Laid-Open Patent Publication No. 8-194969, an constant amplitude AGC (automatic gain control) performs gain control so as to normalize the amplitudes of the output signals from the two light receiving elements that are divided from each other in a direction tangential to the track, and then, the wobble signal is detected based on the difference between the normalized amplitudes.

In the optical disk device, data "1" and "0" correspond to a mark (pit) region and a space region, respectively. The reflectance of the mark region is different from the reflectance of the space region. In some cases, a method of forming the mark region and the space region differs depending on a type of the optical disk device.

For example, at the time of forming the mark region on a phase change type medium such as the DVD+RW that includes specific alloy at the recording layer, the temperature of the specific alloy is raised to a first temperature by laser light, and then, is rapidly cooled by reducing the power of the laser light so that the specific alloy can be amorphous. Meanwhile, at the time of forming the space region of the phase change type medium, the temperature of the specific alloy is raised to a second temperature lower than the first temperature, and then, is gradually cooled so that the specific alloy can be crystalline. In this manner, the reflectance of the mark region becomes lower than the reflectance of the space region. In this case, as shown in FIG. 1, the intensity of the average laser light power at the time of forming the mark region is approximately equal to the intensity of the average laser light power at the time of forming the space region.

On the other hand, at the time of forming the mark region on a pigment type medium such as the DVD+R that includes organic pigment at the recording layer, the pigment is heated and melt by increasing the laser light power so that the part of the substrate contacting with the pigment can be transformed. Meanwhile, at the time of forming the space region on the pigment type medium, the laser light power is set to be small power approximately equal to the data reproducing laser light power so that the substrate cannot be transformed. In this manner, the reflectance of the mark region becomes lower than the reflectance of the space region. In the case of the pigment type medium, as shown in FIG. 1, the intensity of the laser light power at the time of forming the space region is much lower than the intensity of the laser light power at the time of forming the mark region. To be specific, as one example, the intensity of the laser light power for forming the space region is about 1.5 mW while the intensity of the laser light power for forming the mark region is about 30 mW.

According to the above-mentioned Japanese Laid-Open Patent Publication No. 8-194969, at the time of reproducing data on both the phase change type medium and the pigment type medium, it is possible to accurately detect the wobble signal. This is because the intensity of the laser light power at the time of reproducing the data is approximately constant, and the changes of the output signals from the light receiving elements are caused by only changes in the reflectance of the optical disk. In this case, the levels of the output signals from the light receiving elements are small, so that the levels of the wobble signals are also amplified by the gain adjustment performed at the constant amplitude AGC circuit.

However, in the case of recording information on the pigment type medium, the intensity of the laser light power for forming the mark region is largely different from the intensity of the laser light power for forming the space region, so that the levels of the output signals from the light receiving elements corresponding to the mark region can be 20 times larger or still larger than the levels of the output signals from the light receiving elements corresponding to the space region. That is, since the levels of the output signals from the light receiving elements corresponding to the mark region are large, the constant amplitude AGC circuit adjusts the gain such that the adjusted signal levels are in the allowable voltage range (dynamic range). Accordingly, the gain at the time of recording becomes smaller than the gain at the time of reproducing, so that the wobble signal component corresponding to the space region becomes undistinguishable from the noise component. Furthermore, at the time of forming the mark region of the pigment type recording medium, since the heat is accumulated in the recording film, the length of the mark region tends to become longer, the laser light power for forming the mark region is switched to be the lower power before the region irradiated by the laser light is actually switched from the mark region to the space region, as shown in FIG. 1. For example, when the ratio between the area of the mark regions and the area of the space regions is 1 to 1, the ratio between the time for which the laser light is emitted at the higher power and the time for which the laser light is emitted at the lower power is about 0.7 to 1.3. The time for which the signals (including the undistinguishable wobble signal components due to the lower gain) corresponding to the higher power laser light are output from the light receiving elements is considerably shorter than the time for which the signals (including the distinguishable wobble signal component due to the higher gain) corresponding to the lower power laser light are output from the light receiving elements. Accordingly, a part of the wobble signal components can be intermittently obtained by the gain adjustment performed at the constant amplitude AGC circuit because the only wobble signal corresponding to the space regions is sufficiently amplified by using the gain controlled by the constant amplitude AGC. That is, the wobble signal cannot be accurately detected.

Even during the recording on the optical disk, it is necessary to rewrite managing information recorded at a predetermined position of the recording region at a predetermined timing. At the time of rewriting the managing information, the recording is stopped momentarily, the managing information is read and altered, and the altered managing information is then recorded at the predetermined position of the recording region. In other words, even during the recording, the reproducing is performed at the predetermined timing. However, when a response speed of the constant amplitude AGC circuit is taken into account, a certain length of time is required at the time of switching between the recording and the reproducing so that the gain can become a predetermined value. Accordingly, during the transitional period between the gain values, the accurate wobble signal cannot be obtained.

SUMMARY OF THE INVENTION

In view of the foregoing, it is an object of the present invention to provide a wobble signal detection circuit that can be used for plural types of recording media and detect a wobble signal having high accuracy and stability at least when an recording operation is performed.

It is another object of the present invention to provide an optical disk device that can be used for plural types of optical recording media and perform an recording operation with good quality and reliability.

According to a first aspect of the present invention, there is provided a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium. Specifically, this wobble signal detection circuit includes a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium, and a first voltage adjustment circuit for adjusting a signal level of the sampled first voltage signal so that an average voltage of the adjusted first voltage signal output from the first sample circuit can be equal to a first target voltage. The wobble signal detection circuit further includes a second sample circuit for, in sync with the specific control signal, sampling a second voltage signal corresponding to an electric signal converted from a light signal being based on the reflected light received by the second light receiving element, a second voltage adjustment circuit for adjusting a signal level of the sampled second voltage signal so that an average voltage of the adjusted second voltage signal output from the second sample circuit can be equal to the first target voltage, and a subtracting circuit for outputting a wobble signal that is difference in level between the signal adjusted and output by the first voltage adjustment circuit and the signal adjusted and output by the second voltage adjustment circuit.

With this wobble signal detection circuit, in sync with the specific control signal, the first sample circuit samples the first voltage signal provided from the first light receiving element, so that the signal generated at the time of forming the space region can be extracted from the first voltage signal. In the same manner, in sync with the specific control signal, the second sample circuit samples the second voltage signal provided from the second light receiving element, so that the signal generated at the time of forming the space region can be extracted. Thereafter, the first voltage adjustment circuit adjusts the signal provided from the first sample circuit so that the average voltage of the provided from the first sample circuit can become the target voltage. In the same manner, the second voltage adjustment circuit adjusts the signal provided from the second sample circuit so that the average voltage of the signal provided from the second sample circuit can become the target voltage. As a result, by the adjustment of the first and second voltage adjustment circuits, the wobble signal components that correspond to the signal generated at the time of forming the space region and are overwhelmed by the noise in the above-mentioned constant amplitude AGC of the prior art can be amplified. The subtracting circuit outputs the wobble signal that is the difference in level between the signal output from the first voltage adjustment circuit and the signal output from the second voltage adjustment circuit. The phase of the wobble signal component included in the signal output from the first voltage adjustment circuit is the opposite of the phase of the wobble signal component included in the signal output from the second voltage adjustment circuit. Accordingly, by taking the difference between the signals output from the first and second voltage adjustment circuits, it is possible to detect the wobble signal in high accuracy. Furthermore, the wobble signal component is detected based on the signal generated at the time of forming the space region. Accordingly, as in the case of recording information on the DVD+R, even when the laser light power for forming the mark region is substantially larger than the laser light power for forming the space region, the recording quality and the like is not affected by the laser light power difference. Of course, as in the case of the rewritable optical disk, when the difference between the laser light power for forming the space region and the laser light power for forming the mark region is not much large, the wobble signal can be obtained in high accuracy. In other words, the wobble signal having high accuracy can be extracted from plural types of optical recording media. In addition, since the first and second voltage adjustment circuits use the same target voltage, even when the first and second light receiving elements receive the reflected light at the positions deviating from the centers of the these light receiving elements, it is possible to detect the wobble signal component in high accuracy.

According to a second aspect of the present invention, the wobble signal detection circuit of the first aspect further includes a first signal adjustment circuit provided at an upstream side of the first voltage adjustment circuit for adjusting an amplitude of the sampled first voltage signal, wherein a gain used in the amplitude adjustment during a recording operation is different from a gain used in the amplitude adjustment during a reproducing operation, and a second signal adjustment circuit provided at an upstream side of the second voltage adjustment circuit for adjusting an amplitude of the sampled second voltage signal, wherein the gain used in the amplitude adjustment during the recording operation is different from the gain used in the amplitude adjustment during the reproducing operation. In this specification, in adjustment of the signal amplitude by using the gain, the amplitude of the signal may be increased, or may be decreased. In the amplitude adjustment by the signal adjustment circuits, the gain used in recording operation is different from the gain used in the reproducing operation. Accordingly, it is possible to effectively use the dynamic ranges of the first and second voltage adjustment circuits. As a result, the wobble signal can be detected in high accuracy.

According to a third aspect of the present invention, the wobble signal detection circuit of the first or second aspects further includes a target voltage setting circuit for setting the first target voltage and a second target voltage achieved by the first voltage adjustment circuit so that the first target voltage set for during the recording operation can be different from the second target voltage set for during a reproducing operation, and setting the first and second target voltages achieved by the second voltage adjustment circuit so that the first target voltage set for during the recording operation can be different from the second target voltage set for during the reproducing operation. In this wobble signal detection circuit, the target voltage setting circuit sets the target voltages so that the level of the wobble signal detected during recording operation can be equal to the level of the wobble signal detected during the reproducing operation. In this manner, it is possible to prevent the detection error of the wobble signal immediately after the operation switching between the recording and the reproducing is performed. That is, it is possible to detect the wobble signal having the high accuracy and stability.

According to a fourth aspect of the present invention, the wobble signal detection circuit of the first, second, or third aspect further includes a speed setting circuit for setting first and second response speeds of the first voltage adjustment circuit to the sampled first voltage signal input thereto so that the first response speed immediately after switching between a recording operation and a reproducing operation is performed is larger than the second response speed during the recording operation; and setting the first and second response speeds of the second voltage adjustment circuit to the sampled second voltage signal input thereto so that the first response speed immediately after switching between the recording operation and the reproducing operation is performed is larger than the second response speed during the recording operation. In this wobble signal detection circuit, the speed setting circuit sets the fast response speed for immediately after the switching between the recording operation and the reproducing operation is carried out. Accordingly, even when the level of the wobble signal component included in the signal generated during the recording is different from the level of the wobble signal component included in the signal generated during the reproducing, it is possible to detect the stable wobble signal immediately after the switching between the recording and the reproducing is performed. Furthermore, the speed setting circuits set the slow response speed during the recording operation, the recording operation is not affected by the signal changes caused by the scratch on the optical recording medium. Accordingly, it is possible to detect the wobble signal having the high accuracy and stability.

According to a fifth aspect of the present invention, there is provided a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium. Specifically, this wobble signal detection circuit includes a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium, and a first amplifying circuit for amplifying an amplitude of the sampled first voltage signal output from the first sample circuit, and outputting the amplified first voltage signal. This wobble signal detection circuit further includes a second sample circuit for, in sync with the specific control signal, sampling a second voltage signal corresponding to an electric signal converted from a light signal being based on the reflected light received by the second light receiving element, a second amplifying circuit for amplifying the sampled second voltage signal output from the second sample circuit, and outputting the amplified second voltage signal, and an arithmetic processing circuit for receiving the amplified first voltage signal output by the first amplifying circuit, the amplified second voltage signal output by the second amplifying circuit, the first voltage signal output by the first light receiving element, and the second voltage signal output by the second light receiving circuit, and for performing an arithmetic process on the received signals so as to output the wobble signal.

With this wobble signal detection circuit, in sync with the specific control signal, the first sample circuit samples the first voltage signal provided from the first light receiving element. As a result, the signal generated at the time of forming the space region is extracted from the first voltage signal. In the same manner, in sync with the specific control signal, the second sample circuit samples the second voltage signal provided from the second light receiving element. As a result, the signal generated at the time of forming the space region is extracted from the second voltage signal. The first amplifying circuit adjusts the amplitude of the signal output from the first sample circuit, and the second amplifying circuit adjusts the amplitude of the signal output from the second sample circuit. In this manner, the wobble signal components that are overwhelmed by the noise in the above-mentioned constant amplitude AGC of the prior art and are included in the signal generated at the time of forming the space region are amplified. The arithmetic processing circuit receives the signals output from the first and second amplifying circuits, and the first and second voltage signals provided from the first and second light receiving elements, and performs the arithmetic process on these received signals. In this case, the wobble signal is detected based on the wobble signal component generated at the time of forming the space region and the wobble signal component generated at the time of forming the mark region. Accordingly, as in the case of recording information on the DVD+R, when the laser light power for forming the mark region is substantially larger than the laser light power for forming the space region, it is possible to detect the wobble signal all the time. In other words, it is possible to detect the wobble signal in high accuracy from plural types of optical recording media.

According to a sixth aspect of the present invention, the arithmetic processing circuit of the fifth aspect includes a first adding circuit for adding the amplified first voltage signal output by the first amplifying circuit and the first voltage signal provided from the first light receiving element, and outputting the added signal, a second adding circuit for adding the amplified second voltage signal output by the second amplifying circuit and the second voltage signal provided from the second light receiving element, and outputting the added signal, and a subtracting circuit for outputting the wobble signal that is a difference in level between the added signal output by the first adding circuit and the added signal output by the second adding circuit.

According to a seventh aspect of the present invention, the arithmetic processing circuit of the fifth aspect includes a first subtracting circuit for outputting a subtracted signal that is a difference in level between the amplified first voltage signal output by the first amplifying circuit and the amplified second voltage signal output by the second amplifying circuit, a second subtracting circuit for outputting a subtracted signal that is a difference in level between the first voltage signal provided from the first light receiving element and the second voltage signal provided from the second light receiving element, and an adding circuit for adding the subtracted signal output by the first subtracting circuit and the subtracted signal output by the second subtracting circuit so as to output the added signal as the wobble signal.

According to an eighth aspect of the present invention, the arithmetic processing circuit of the fifth aspect includes a first subtracting circuit for outputting a subtracted signal that is a difference in level between the amplified first voltage signal output by the first amplifying circuit and the amplified second voltage signal output by the second amplifying circuit, a second subtracting circuit for outputting a subtracted signal that is a difference in level between the first voltage signal provided from the first light receiving element and the second voltage signal provided from the second light receiving element, and a signal switching circuit for, in sync with the specific control signal, selecting the subtracted signal output by the first subtracting circuit during a period for forming the space region, and selecting the subtracted signal output by the second subtracting circuit during a period for forming a mark region so as to output the selected signal as the wobble signal.

According to a ninth aspect of the present invention, the wobble signal detection circuit in any one of fifth to eighth aspects further includes a first DC component removing circuit provided at an upstream side of the arithmetic processing circuit for removing a DC component from the amplified first voltage signal to be received by the arithmetic processing circuit, a second DC component removing circuit provided at an upstream side of the arithmetic processing circuit for removing a DC component from the amplified second voltage signal to be received by the arithmetic processing circuit, a third DC component removing circuit provided at an upstream side of the arithmetic processing circuit for removing a DC component from the first voltage signal that is provided from the first light receiving element and is to be received by the arithmetic processing circuit, and a fourth DC component removing circuit provided at an upstream side of the arithmetic processing circuit for removing a DC component from the second voltage signal that is provided from the second light receiving element and is to be received by the arithmetic processing circuit.

According to a tenth aspect of the present invention, there is provided a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium. Specifically, this wobble signal detection circuit includes a first amplitude adjustment circuit for adjusting an amplitude of a first voltage signal so that the first voltage signal can be equal to a target voltage, wherein the first voltage signal corresponds to an electric signal converted from a light signal being based on the reflected light received by the first light receiving element, and outputting the adjusted first voltage signal, and a second amplitude adjustment circuit for adjusting an amplitude of a second voltage signal so that the second voltage signal can be equal to the target voltage, wherein the second voltage signal corresponds to an electric signal converted from a light signal being based on the reflected light received by the second light receiving element, and outputting the adjusted second voltage signal. This wobble signal detection circuit further includes a target amplitude setting circuit for setting the target voltage achieved by the first amplitude adjustment circuit, and the target voltage achieved by the second amplitude adjustment circuit, and a subtracting circuit for outputting the wobble signal that is a difference between the adjusted first voltage signal output by the first amplitude adjustment circuit and the adjusted second voltage signal output by the second amplitude adjustment circuit.

In this wobble signal detection circuit, for example, the target voltage achieved by the first and second amplitude adjustment circuits during the recording may be set individually from the target voltage achieved by the first and second amplitude adjustment circuits during the reproducing so that the level of the wobble signal detected during the recording can be approximately equal to the level of the wobble signal detected during the reproducing. In this manner, it is possible to prevent the detection error of the wobble signal immediately after the operation switching between the recording and the reproducing is performed. In other words, it is possible to detect the wobble signal having high accuracy and stability.

According to an eleventh aspect of the present invention, there is provided a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium. Specifically, the wobble signal detection circuit includes a first amplitude adjustment circuit for adjusting an amplitude of a first voltage signal corresponding to an electric signal converted from a light signal being based on the reflected light received by the first light receiving element, a second amplitude adjustment circuit for adjusting an amplitude of a second voltage signal corresponding to an electric signal converted from a light signal being based on the reflected light received by the second light receiving element, and a speed setting circuit for setting first and second response speeds of the first amplitude adjustment circuit to the first voltage signal input thereto, and the first and second response speeds of the second amplitude adjustment circuit to the second voltage signal input thereto so that the first response speed immediately after switching between a recording operation and a reproducing operation is performed is larger than the second response speed during the recording operation. This wobble signal detection circuit further includes a subtracting circuit for outputting the wobble signal that is a difference between the adjusted first voltage signal output by the first amplitude adjustment circuit and the adjusted second voltage signal output by the second amplitude adjustment circuit.

According to a twelfth aspect of the present invention, there is provided a wobble signal detection unit including a plurality of wobble signal detection circuits selected from those of first to ninth aspects. This wobble signal detection unit further includes a selecting circuit for selecting one wobble signal circuit from the plurality of wobble signal detection circuits, based on a signal indicating the type of the optical recording medium.

According to a thirteen aspect of the present invention, there is provided an optical disk device that performs recording on the optical recording medium and includes any one of the wobble signal detection circuits of the first to eleventh aspects. This optical disk device further includes a processing unit for performing the recording processing by using the wobble signal detected by the wobble signal detection circuit.

PREFERRED EMBODIMENTS OF THE PRESENT INVENTION

One Embodiment of the present invention will be described based on FIGS. 2 to 13.

Figure 1:
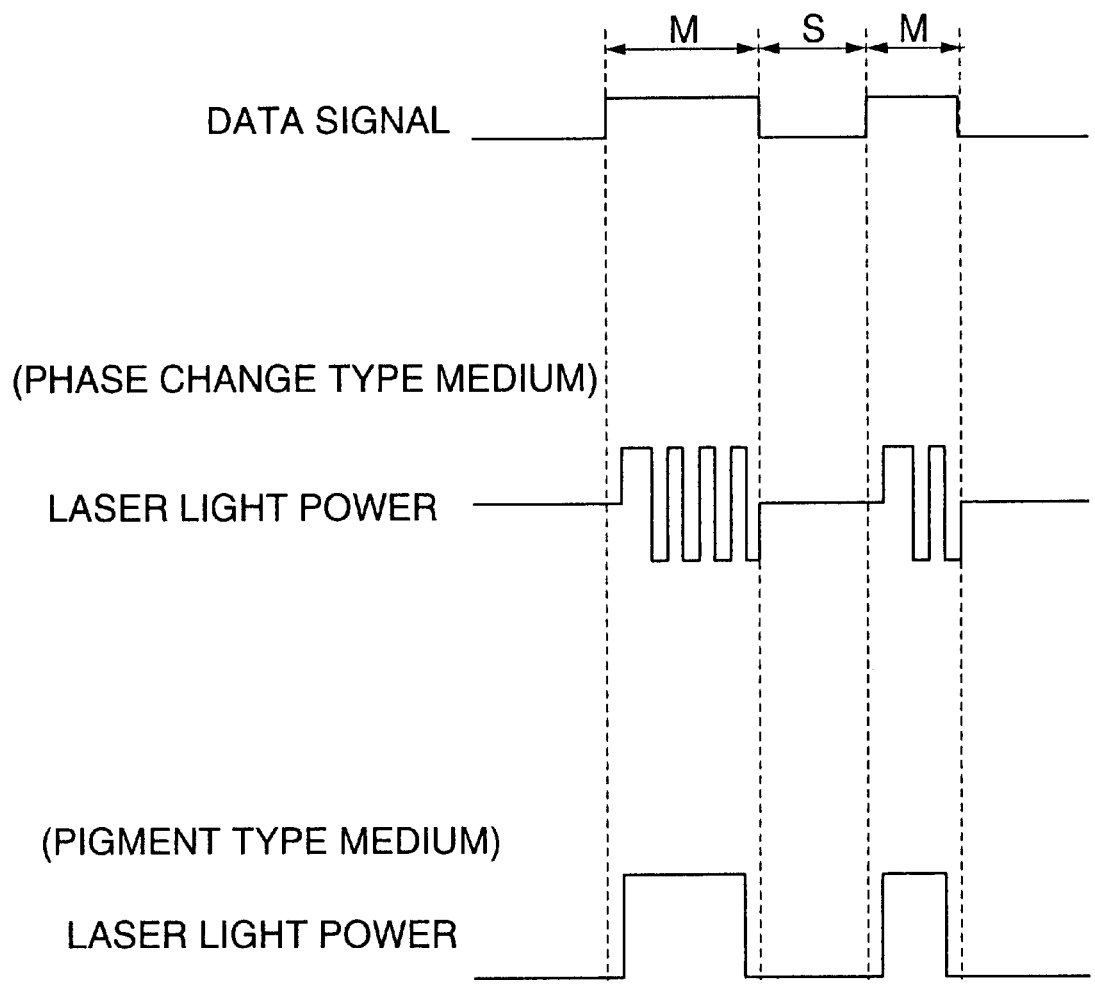
FIG. 1 shows patterns of laser powers for a pigment type medium and a phase change type medium.
Figure 2:
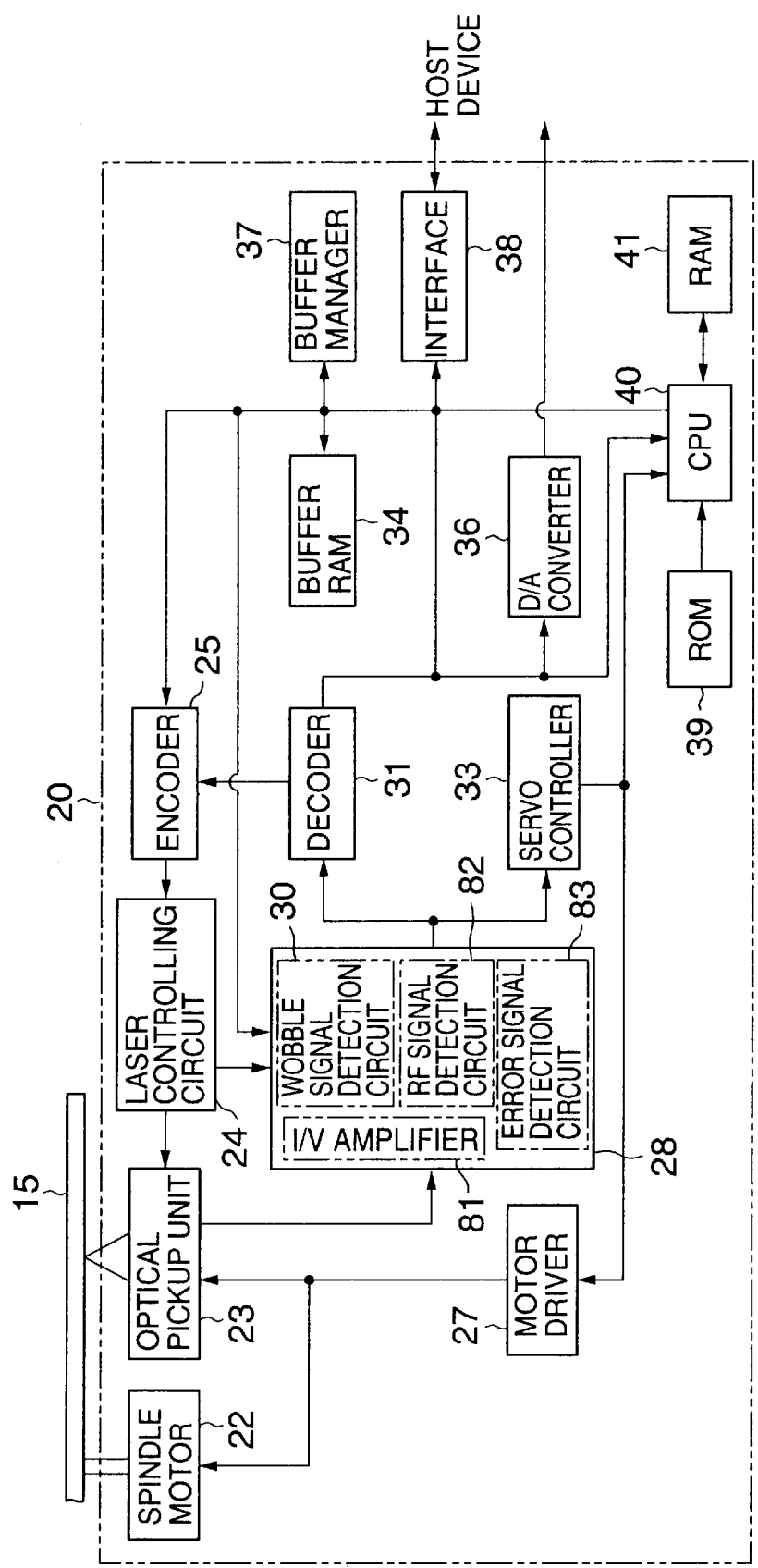
FIG. 2 is a block diagram showing a configuration of an optical disk device according to an embodiment of the present invention.

FIG. 2 shows an optical disk device 20 that includes a wobble signal detection circuit 30 according to the embodiment of the present invention. As shown in FIG. 2, the optical disk device 20 further includes a spindle motor 22 for rotating an optical disk 15 that is an optical recording medium, an optical pickup unit 23, a laser controlling circuit 24, an encoder 25, a motor driver 27, an analog signal processing circuit 28, a decoder 31, a servo controller 33, a buffer RAM 34, a D/A converter 36, a buffer manager 37, an interface 38, a ROM 39, a CPU 40, and a RAM 41. The arrows in FIG. 1 indicate the flow of signals and information, but do not indicate all connections between respective blocks in FIG. 2. In this embodiment, as one example, a DVD is used as the optical disk 15.

The optical pickup unit 23 includes a semiconductor laser source, and an optical system for guiding the light flux emitted from the semiconductor laser source to the recording surface of the optical disk 15, and guiding the returning light flux reflected by the recording surface to a predetermined light receiving position. The optical pickup unit 23 further includes a light receiver disposed at the predetermined light receiving position for receiving the returning light flux, and a driving system that has a focusing actuator, a tracking actuator, a seeking motor (not shown), and the like.

Figure 3A:
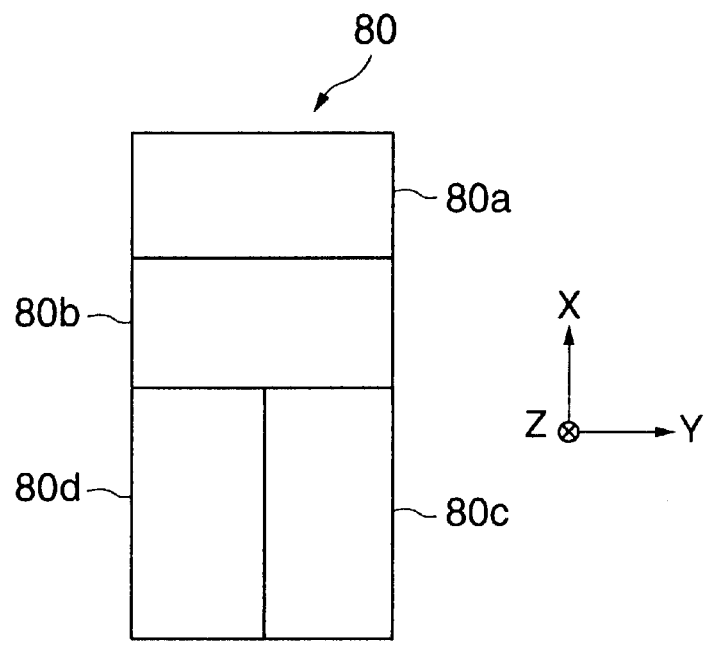
FIG. 3A is an illustration showing an example of arrangement of light receiving elements of the optical disk device shown in FIG. 2.

The light receiver includes a 4-division type light receiving element 80 having a first light receiving element 80a, a second light receiving element 80b, a third light receiving element 80c, and a fourth light receiving element 80d, as shown in FIG. 3A. In FIG. 3A, the direction of the X axis designates the upper direction on the sheet on FIG. 3A, the direction of the Y axis designates the right direction on FIG. 3A, and the direction of the Z axis designates the direction from the front side to the back side of FIG. 3A. In FIG. 3A, the first light receiving element 80a and the second light receiving element 80b each has a rectangular shape of which longer sides extend in the direction of the Y axis (the right and left directions on FIG. 3A). In FIG. 3A, the third light receiving element 80c and the fourth light receiving element 80d each has a rectangular shape of which longer sides extend in the direction of the X axis (the upper-side-to-lower-side direction on FIG. 3A). At the lower side of the first light receiving element 80a, the second light receiving element 80b is disposed so as to contact with the first light receiving element 80b, as shown in FIG. 3A. As shown in FIG. 3A, at the left side of the third light receiving element 80c, the fourth light receiving element 80d is disposed so as to contact with the third light receiving element 80c.

Figure 3B:
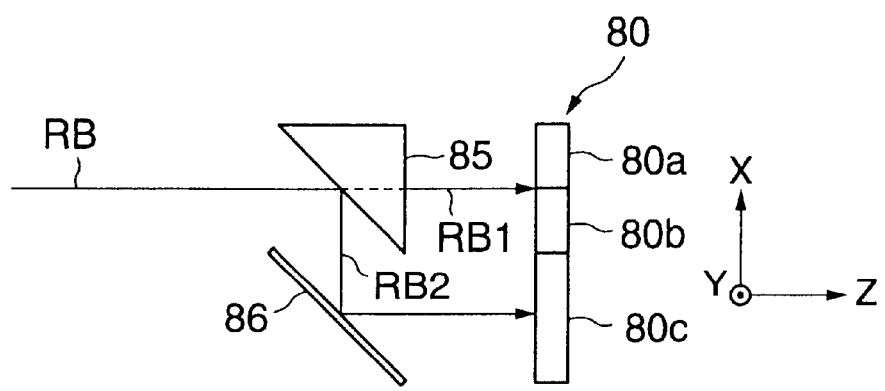
FIG. 3B is a view when seen from the side of FIG. 3A.

As shown in FIG. 3B that is a view when seen from the right side of FIG. 3A, the reflected light beam RB from the recording surface of the optical disk 15 branches in two directions at a prism 85 constituting the optical system of the optical pickup unit 23 so as to become a light beam RB1 and a light beam RB2. The first light receiving element 80a and, the second light receiving element 80b are irradiated by the light beam RB1 that penetrates the prism 85. On the other hand, as shown in FIG. 3B, the transmitting direction of the light beam RB2 that branches in the −X direction of FIG. 3B at the prism 85 is bent by a reflecting mirror 86 so that the third light receiving element 80c and the fourth light receiving element 80d can receive the light beam RB2.

Figure 4A:
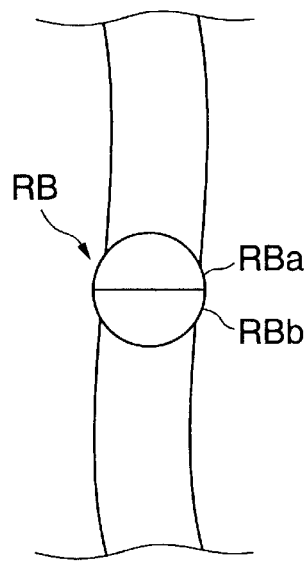
FIG. 4A is an illustration showing parts that are irradiated by the reflected light from an optical disk and are on the light receiving elements of FIGS. 3A and 3B.
Figure 4B:
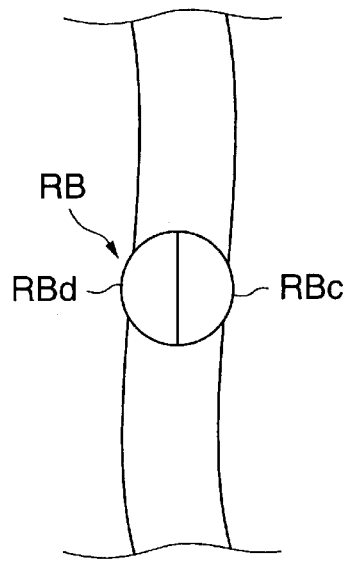
FIG. 4B is an illustration showing parts of the light receiving elements of FIGS. 3A and 3B irradiated by the reflected light.

As shown in FIG. 4A, the first light receiving element 80a receives a light beam RBa that is the upper part of the light beam RB, and the second light receiving element 80b receives a light beam RBb that is the lower part of the light beam RB. As shown in FIG. 4B, the third light receiving element 80c receives a light beam RBc that is the right part of the light beam RB, and the fourth light receiving element 80d receives a light beam RBd that is the left part of the light beam RB. The light receiving elements 80a to 80d each convert the light signal into the electric signal, and output, to the analog signal processing circuit 28, an electric current (electric signal) as the converted electric signal from the light signal. This electric current output is based on an amount of the light received by the light receiving elements 80a to 80d.

The light receiver is not limited to this 4-division type light receiving element 80, but may be configured so as to include a 2-division type light receiving element having the first and second light receiving elements 80a and 80b, and another 2-division type light receiving element having the third and fourth light receiving elements 80c and 80d. Furthermore, the four light receiving elements may be arranged in a row. In addition, the shapes and arrangement of the light receiving elements are not limited to this embodiment of the present invention.

Referring to FIG. 2, the analog signal processing circuit 28 includes a current-to-voltage converting amplifier unit 81a for converting, into voltage signals, current signals that are the signals output from the light receiving elements 80a to 80d of the optical pickup unit 23, a wobble signal detection circuit 30 for detecting the wobble signal, a RF signal detection circuit for detecting a RF signal having reproducing information, and an error signal detection circuit 83 for detecting an error signal such as a focusing error signal and a tracking error signal.

Figure 5:
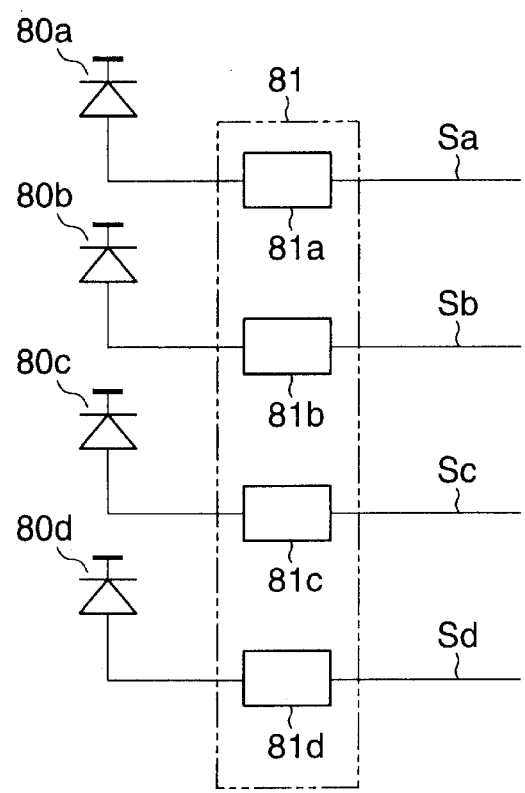
FIG. 5 is a block diagram showing a configuration of an I/V amplifier shown in FIG. 2.

As shown in FIG. 5, the current-to-voltage converting amplifier unit 81 includes a first current-to-voltage converting amplifier 80a for converting, into a voltage signal (signal Sa), the current signal output from the first light receiving element 80a, a second current-to-voltage converting amplifier 81b for converting, into a voltage signal (signal Sb), the current signal output from the second light receiving element 80b, a third current-to-voltage converting amplifier 81c for converting, into a voltage signal (signal Sc), the current signal output from the third light receiving element 80c, and a fourth current-to-voltage converting amplifier for converting, into a voltage signal (signal Sd), the current signal output from the fourth light receiving element 80d.

The RF signal detection circuit 82 adds the signal Sa, the signal Sb, the signal Sc, and the signal Sd, and converts the added value into a two-valued variable to detect the two-valued variable as the RF signal.

The error signal detection circuit 83 calculates the difference in level between the signal Sa and the signal Sb, and converts the obtained difference into a two-valued variable to detect the two-valued variable as the focusing error signal. Furthermore, the error signal detection circuit 83 calculates the difference in level between the signal Sc and the signal Sd, and converts the calculated difference into a two-valued variable to detect the two-valued variable as the tracking error signal. The error signal detection circuit 83 outputs the detected focusing error signal and tracking error signal to the servo controller 33.

Meanwhile, the wobble signal detection circuit 30 detects the wobble signal based on the signal Sc and the signal Sd.

The decoder 31 extracts address information, synchronizing signal, and the like based on the ADIP information included in the wobble signal detected by the wobble signal detection circuit 30. The decoder 31 outputs the extracted address information to the CPU 40, and outputs the synchronizing signal to the encoder 25.

The decoder 31 performs a reproducing process such as a demodulating process and an error correction process on the RF signal detected by the RF signal detection circuit 82. When the data to be reproduced are data such as image data and document data other than music data, the decoder 31 performs an error checking process and the error correction process based on a checking code added to the data, and stores the data in the buffer RAM 34 via the buffer manager 37.

Based on the focusing error signal detected by the error signal detection circuit 83, the servo controller 33 generates a control signal for controlling a focusing actuator of the optical pickup unit 23, and outputs the generated control signal to the motor driver 27. Furthermore, based on the tracking error signal, the servo controller 33 generates a control signal for controlling a tracking actuator of the optical pickup unit 23, and outputs the generated control signal to the motor driver 27.

Meanwhile, when the data recorded on the optical disk 15 are music data, the D/A converter 36 converts the signal output from the decoder 31 into analog data, and outputs the converted analog data as an audio signal to audio equipment, or the like.

The buffer manager 37 accumulates and manages the data to be provided to the buffer RAM 34. When an amount of the data accumulated in the buffer RAM 34 reaches a predetermined amount, the buffer manager reports this fact to the CPU 40.

The motor driver 27 drives the focusing actuator and the tracking actuator of the optical pickup unit 23, based on the control signals provided from the servo controller 33. Based on instruction provided from the CPU 40, the motor driver 27 controls the spindle motor 22 such that a linear velocity of the optical disk 15 becomes constant, or an angular velocity of the optical disk 15 becomes constant. Furthermore, based on instruction given by the CPU 40, the motor driver 27 drives the seeking motor of the optical pickup unit 23 to control the position of the optical pickup unit 23 with respect to the sledging direction of the optical pickup unit 23, i.e., the radial direction of the optical disk 15.

The encoder 25 adds the error correction code to the data held by the buffer RAM 34, and generates the data to be written on the optical disk 15. Then, in sync with the synchronizing signal provided from the decoder 31, the encoder 25 outputs the data to be written on the optical disk 15 to the laser controlling circuit 24, based on the instruction provided from the CPU 40.

The laser controlling circuit 24 controls the power of the semiconductor laser emitted from the optical pickup unit 23, based on the data to be written on the optical disk 15 provided from the encoder 25. Furthermore, during recording, the laser controlling circuit 24 outputs, to the wobble signal detection circuit 30, timing signals concurrent with the time of recording on the mark region and the time of recording on the space region.

The interface 39 is a communication interface that enables interactive communication with a host device such as a personal computer. The interface 38 is based on the standard interface such as the ATAPI (AT Attachment Packet Interface) and the SCSI (Small Computer System Interface).

Next, a configuration of the wobble signal detection circuit 30 will be described with reference to FIGS. 6 to 9.

Figure 6:
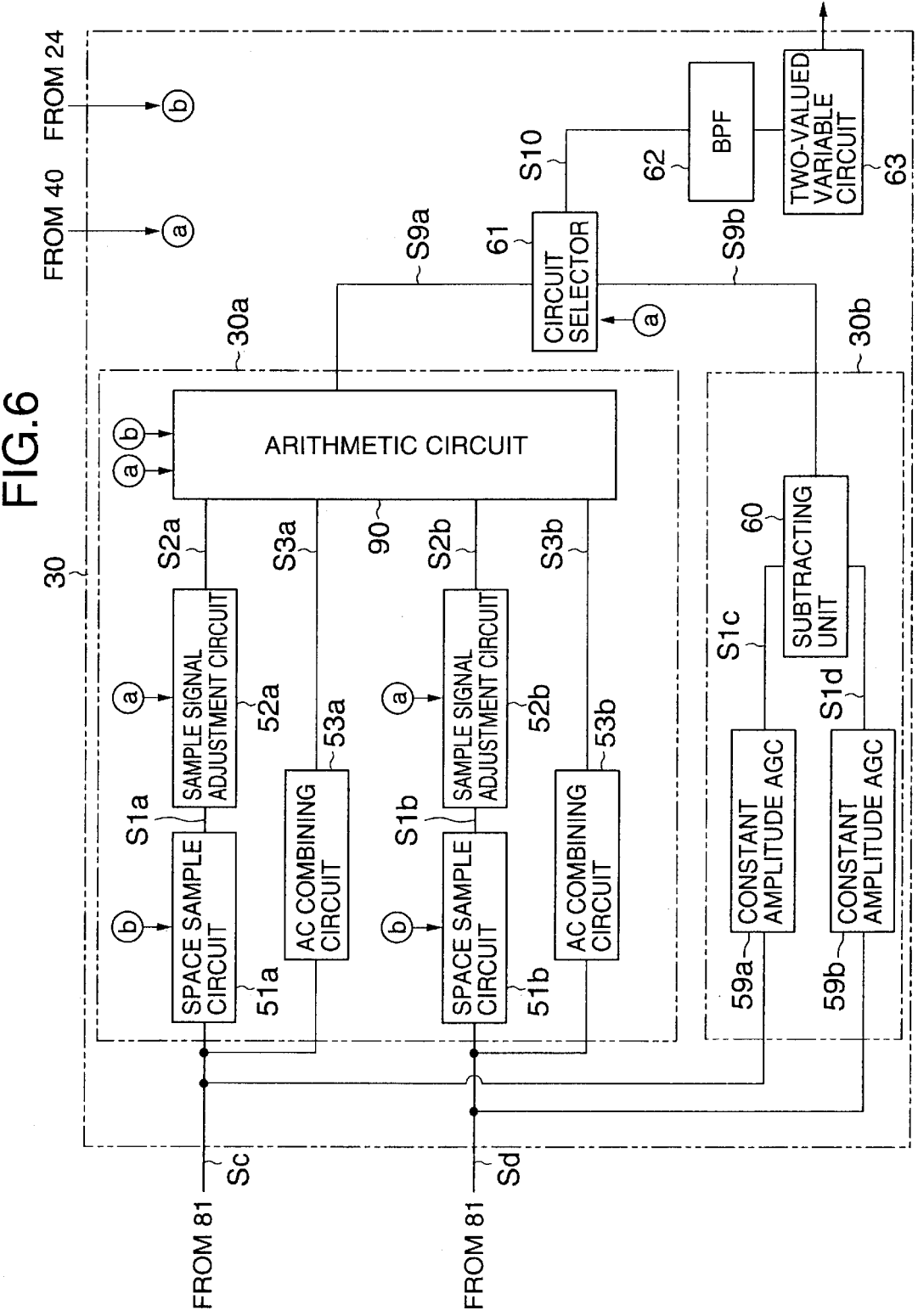
FIG. 6 is a block diagram showing a configuration of a wobble signal detection circuit shown in FIG. 2.

As shown in FIG. 6, the wobble signal detection circuit 30 includes a first signal extraction circuit 30a, a second signal extraction circuit 30b, a circuit selector 61, a band limitation circuit 62, and a two-valued variable circuit 63.

The first signal extraction circuit 30a includes a first space sample circuit 51a, a first sample signal adjustment circuit 52a, a first AC combining circuit 53a, a second space sample circuit 51b, a second sample signal adjustment circuit 52b, a second AC combining circuit 53b, and an arithmetic circuit 90.

The second signal extraction circuit 30b includes a constant amplitude AGC 59a, a second constant amplitude AGC 59b, and a subtracting unit 60.

Figure 7:
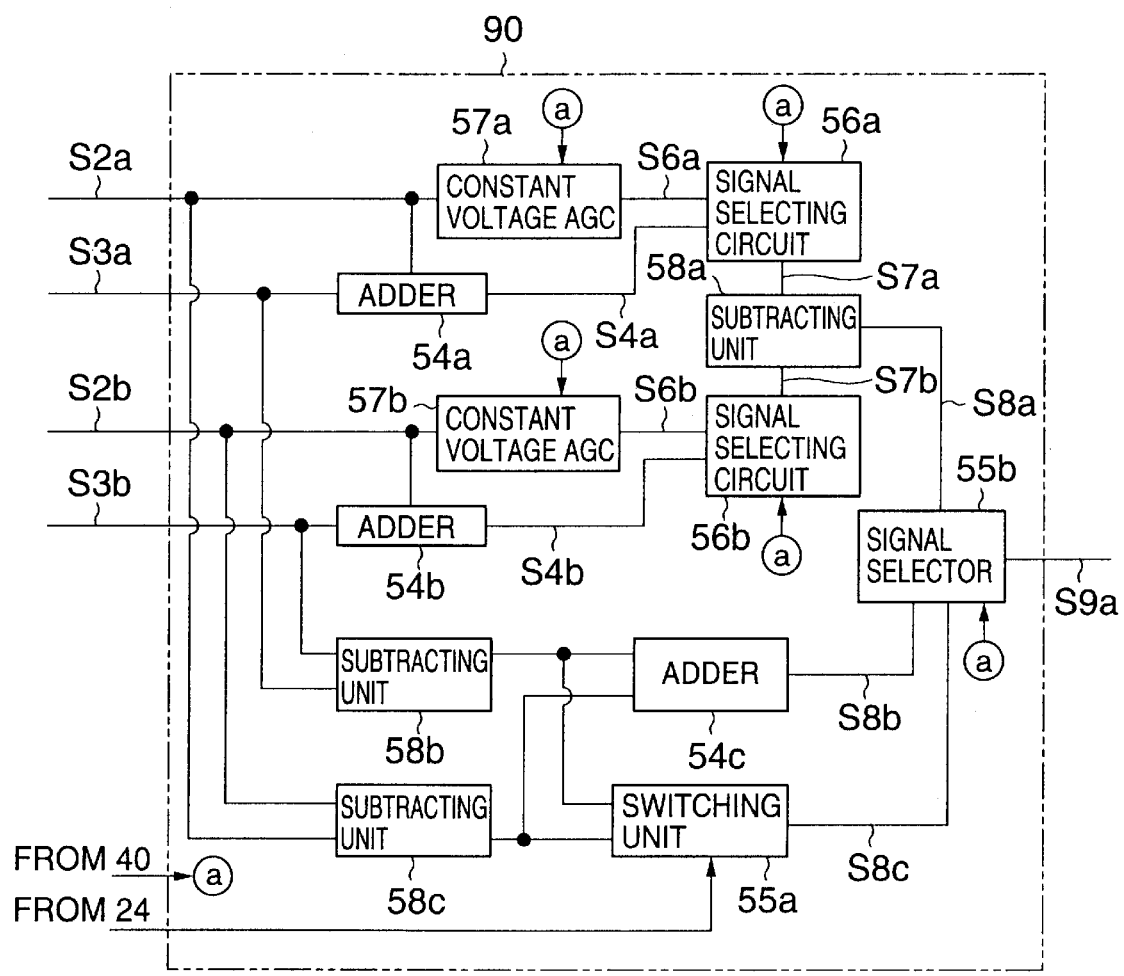
FIG. 7 is a block diagram showing a configuration of an arithmetic circuit shown in FIG. 6.

As shown in FIG. 7, the arithmetic circuit 90 includes a first constant voltage AGC 57a, a first adder 54a, a first signal selection circuit 56a, a second constant voltage AGC 57b, a second adder 54b, a second signal selection circuit 56b, a second subtracting unit 58a, a third subtracting unit 58b, a fourth subtracting unit 58c, a third adder 54c, a switching unit 55a, and a signal selector 55b.

In FIG. 6, during recording, the first space sample circuit 51a samples the signal component of the signal Sc at the time of recording on the space region, in sync with the timing signal provided from the laser controlling circuit 24, and outputs the sampled signal component as a signal S1a. The signal level of the signal S1a is determined based on a reference level (a reference voltage) corresponding to the signal level at the time of recording on the mark region. During reproducing, the first space sample circuit 51a does not sample the component of the signal Sc, and outputs the signal Sc itself as the signal S1a.

Figure 8A:
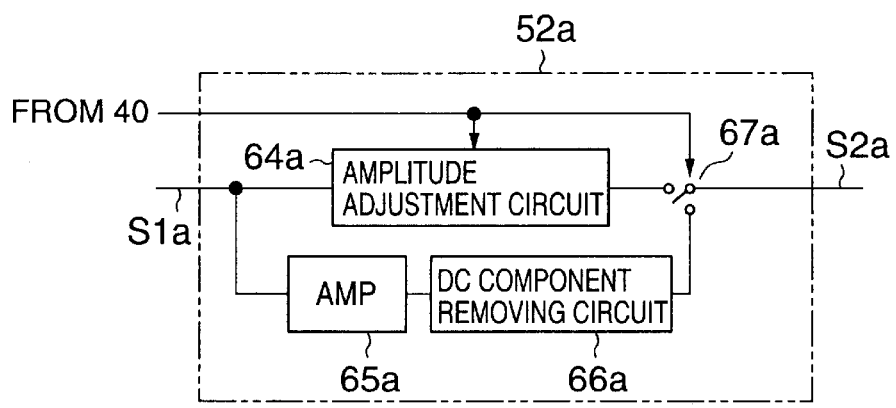
FIG. 8A is a block diagram showing a configuration of a first sample signal adjustment circuit shown in FIG. 6.
Figure 8B:
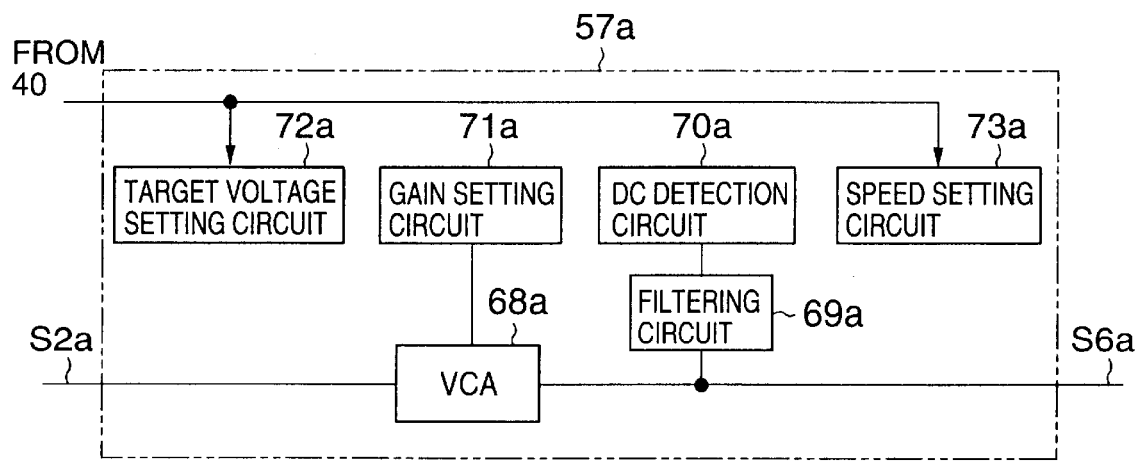
FIG. 8B is a block diagram showing a configuration of a first constant voltage AGC shown in FIG. 7.

The first sample adjustment circuit 52a includes an amplitude adjustment circuit 64a, an amplifier 65a, a DC component removing circuit 66a, and an output signal switch 67a, as shown in FIG. 8A.

The amplitude adjustment circuit 64a adjusts the amplitude of the signal S1a output from the first space sample circuit 51a to be an appropriate amplitude that is distinguishable from the noise and is not saturated. In this example, at least two gain values G1 and G2 are set as adjustment gains in advance. The amplitude adjustment circuit 64a selects one of the two gain values G1 and G2 by the instruction provided from the CPU 40. According to the embodiment of the present invention, as one example, the amplitude adjustment circuit 64a selects the gain G1 at the time of reproducing, and selects the gain G2 at the time of recording in accordance with the instructions from the CPU 40.

The amplifier 65a amplifies the signal S1a output from the first space sample circuit 51a. The gains of the amplifier 65a are set such that the signal level of the wobble signal component included in the signal S1a becomes approximately equal to the signal level of the wobble signal component included in the signal Sc obtained at the time of forming the mark region.

The Dc component removing circuit 66a removes the DC component included in the signal output from the amplifier 65a.

The CPU 40 controls the output signal switch 67a so that the output signal switch 67a can select either the signal output from the amplitude adjustment circuit 64a or the signal output from the DC component removing circuit 66a to output the selected signal as the signal S2a output from the first sample signal adjustment circuit 52a.

In FIG. 6, the first AC combining circuit 53a removes the DC component from the signal Sc to output the signal as the signal S3a on which the DC component removing process has been performed.

During recording, the second space sample circuit 51b samples the signal component of the signal Sd at the time of forming the space region, in sync with the timing signal provided from the laser control circuit 24, and outputs the sampled signal component as the signal S1b. The signal level of the signal S1b is determined based on a reference level (a reference voltage) corresponding to the signal level at the time of forming the mark region. On the other hand, during reproducing, the second space sample circuit 51b does not sample the signal component of the signal Sd, and outputs the signal Sd itself as the signal S1b.

The second sample signal adjustment circuit 52b includes an amplitude adjustment circuit 64b, an amplifier 65b, a DC component removing circuit 66b, and an output signal switch 67b (which are not shown), similarly with respect to the first sample signal adjustment circuit 52a. The second sample signal adjustment circuit 52b adjusts the signal S1b output from the second space sample circuit 51b in the same manner performed by the first sample signal adjustment circuit 52a, and outputs the signal as the signal S2b.

The second AC combining circuit 53b removes the DC component from the signal Sd, and outputs the signal as the signal S3b on which the DC component removing process has been performed.

The arithmetic circuit 90 receives the signal S2a output from the first sample signal adjustment circuit 52a, the signal S3a output from the first AC combining circuit 53a, the signal S2b output from the second sample signal adjustment circuit 52b, and the signal S3b output from the second AC combining circuit 53b. The arithmetic circuit 90 performs a predetermined process based on these input signals.

Figure 9A:
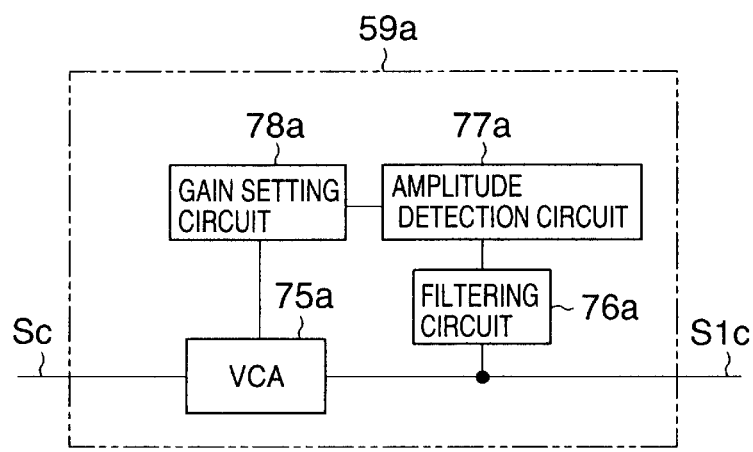
FIG. 9A is a block diagram showing a configuration of a first constant amplitude AGC shown in FIG. 6.

As shown in FIG. 9A, the first constant amplitude AGC 59a includes a VCA circuit 75a, a filtering circuit 76a, an amplitude detection circuit 77a, and a gain setting circuit 78a, similarly with respect to the constant amplitude AGC of the prior art. The filtering circuit 76a removes high frequency component from the signal output from the VCA circuit 75a. The amplitude detection circuit 77a detects the amplitude of the signal output from the filtering circuit 76a. The gain setting circuit 78a sets the gain of the VCA circuit 75a based on the amplitude detected by the amplitude detection circuit 77a. The VCA circuit 75a adjusts the amplitude of the signal Sc based on the gain set by the gain setting circuit 78a.

The second constant amplitude AGC 59b has the configuration that is the same as the configuration of the first constant amplitude AGC 59a. The second constant amplitude AGC 59b adjusts the amplitude of the signal Sd. The setting of the first and second constant amplitude AGCs 59a and 59b is made such that the amplitude of the signal S1c output from the first constant amplitude AGC 59a is equal to the amplitude of the signal S1d output from the second constant amplitude AGC 59b.

In FIG. 6, the first subtracting unit 60 outputs a signal S9b that is the difference in level between the signal S1c output from the first constant amplitude AGC 59a and the signal S1d output from the second constant amplitude AGC 59b.

The CPU 40 controls the circuit selector 61 so that the circuit selector 61 can select either a signal S9a output from the arithmetic circuit 90 or the signal S9b output from the first subtracting unit 60. The circuit selector 61 then outputs the selected signal as a signal S10. In other words, the circuit selector 61 selects either the first signal extraction circuit 30a or the second signal extraction circuit 30b.

The band limitation circuit 62 includes a BPF (band passing filter), and extracts the wobble signal from the signal S10 output from the circuit selector 61. Alternatively, the band limitation circuit 62 may include a LPF (low passing filter), instead of the BPF.

The two-valued variable circuit 63 includes a comparator, for example, and converts the signal output from the band limitation circuit 62 into a two-valued variable to output the converted two-valued variable as the wobble signal.

Next, the arithmetic circuit will be described.

The first adder 54a adds the signal S2a output from the first sample signal adjustment circuit 52a and the signal S3a output from the first AC combining circuit 57a to output the added signal as a signal S4a.

As shown in FIG. 8A, the first constant amplitude AGC 57a includes a VCA (voltage control amplifier) circuit 68a, a filtering circuit 69a, a DC detection circuit 70a, a gain setting circuit 71a, a target voltage setting circuit 72a, and a speed setting circuit 73a.

The CPU 40 controls the target voltage setting circuit 72a so that the target voltage setting circuit 72a can set a target voltage. According to this embodiment of the present invention, the target voltage setting circuit 72a sets the voltage for reproducing to be a target voltage Vs, and sets a voltage for recording to be a target voltage Vk. The CPU 40 controls the speed setting circuit 73a so that the speed setting circuit 73a can set a response speed to the input signal for the VCA circuit 68a. In this embodiment, the speed setting circuit 73a sets the response speed to be a response speed VRf immediately after the switching between the recording operation and the reproducing operation is performed. In the period other than immediately after the switching between the recording operation and the reproducing operation is performed, the speed setting circuit 73a sets the response speed to be a response speed VRs that is lower than the response speed VRf. The filtering circuit 69a removes a high frequency component from the signal output from the VCA circuit 68a. The DC detection circuit 70a detects an average DC voltage level of the signal output from the filtering circuit 69a. The gain setting circuit 71a sets the gain of the VCA circuit 68a such that the average DC voltage level detected by the DC detection circuit 70a becomes equal to the target voltage set by the target voltage setting circuit 72a. At the response speed set by the speed setting circuit 73a, the VCA circuit 68a adjusts the signal S2a output from the first sample signal adjustment circuit 52a.

The CPU 40 controls the first signal selecting circuit 56a so that the first signal selecting circuit 56a can select either the signal S6a output from the first constant voltage AGC 57a or the signal S4a output from the first adder 54a. The first signal selecting circuit 56a outputs the selected signal as a signal S7a.

The second adder 54b adds the signal S2b output from the second sample signal adjustment circuit 52b and the signal S3b output from the second AC combining circuit 53b to output the added signal as a signal S4b.

Similarly with respect to the first constant voltage AGC 57a, the second constant voltage AGC 57b includes a VCA circuit 68b, a filtering circuit 69b, a DC detection circuit 70b, an gain setting circuit 71b, a target voltage setting circuit 72b, and a speed setting circuit 73b (which are not shown in the drawings). The second constant voltage AGC 57b adjusts the signal level of the signal S2b output from the second sample signal adjustment circuit 52b such that the average DC voltage level of the signal S2b becomes equal to the target voltage. Then, the second constant voltage AGC 57b outputs the thus-adjusted signal as a signal S6b. The values of the target voltage and the response speed set for the second constant voltage AGC 57b are made to be equal to the values of the target voltage and the response speed set for the first constant voltage AGC 57a.

The CPU 40 controls the second signal selecting circuit 56b so that the second signal selecting circuit 56b can select either the signal S6b output from the second constant voltage AGC 57b or the signal S4b output from the second adder 54b. The second signal selecting circuit 56b outputs the selected signal as a signal S7b.

The second subtracting unit 58a outputs a signal S8a that is the difference in level between the signal S7a output from the first signal selecting circuit 56a and the signal S7b output from the second signal selecting circuit 56b. The phase of the wobble signal component included in the signal S7a output from the first signal selecting circuit 56a is the opposite of the phase of the wobble signal component included in the signal S7b output from the second signal selecting circuit 56b. Accordingly, the wobble signal component is amplified by the second subtracting unit 58a.

The third subtracting unit 58b outputs the signal that is the difference in level between the signal S3a and the signal S3b.

The fourth subtracting unit 58c outputs the signal that is the difference in level between the signal S2a and the signal S2b.

In sync with the timing signal provided from the laser controlling circuit 24, the switching unit 55a selects the signal output from the third subtracting unit 58b at the time of forming the mark region, and selects the signal output from the fourth subtracting unit 58c at the time of forming the space region. The switching unit 55a outputs the selected signal as a signal S8c.

The third adder 54c adds the signal output from the third subtracting unit 58b and the signal output from the fourth subtracting unit 58c to output the added signals as a signal S8b.

The CPU 40 controls a signal selector 55b so that the signal selector 55b can select one signal from the signal S8a output by the second subtracting unit 58a, the signal S8b output by the third adder 54c, and the signal output S8c by the switching unit 55a to output the selected signal as a signal S9a.

Figure 9B:
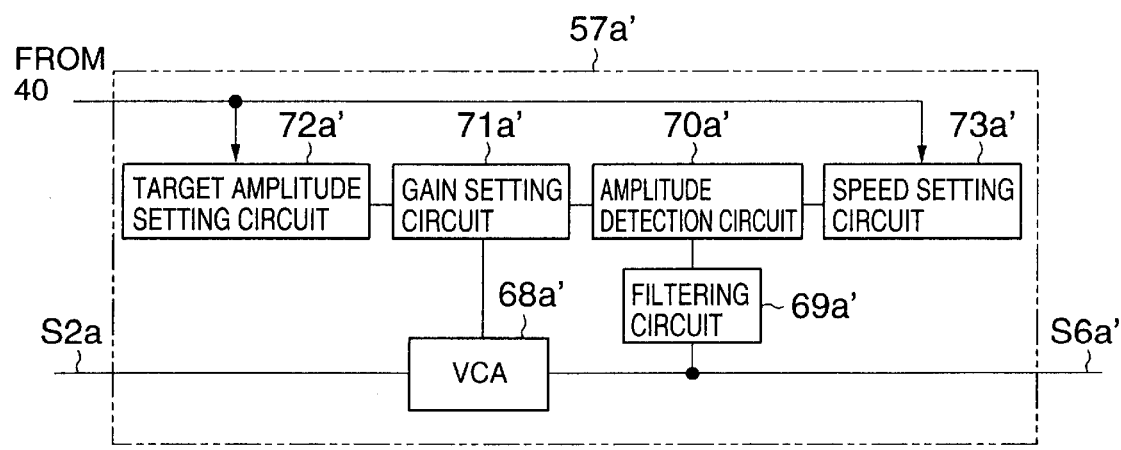
FIG. 9B is a block diagram showing a configuration of a third constant amplitude AGC of FIG. 7 that may be used instead of the first constant voltage AGC of FIG. 8B.
Figure 10:
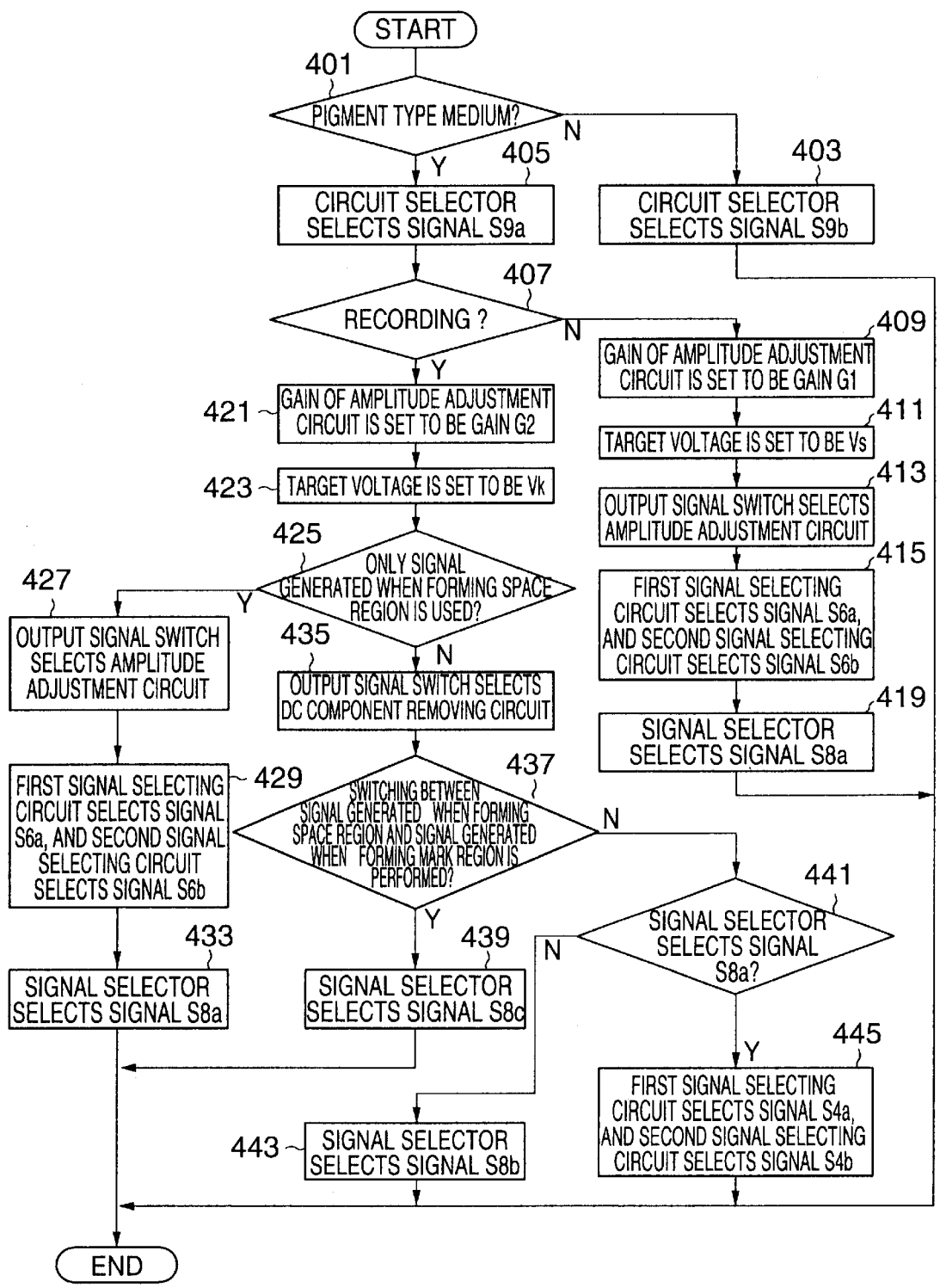
FIG. 10 is a flow chart showing a procedure of setting for the wobble signal detection circuit shown in FIG. 6.

As shown in FIG. 9B, a third constant voltage AGC 57a' including a VCA circuit 68a', a filtering circuit 69a', an amplitude detection circuit 70a', a gain setting circuit 71a', a target amplitude setting circuit 72a', and a speed setting circuit 73a' may be used instead of the first constant amplitude AGC 57a.

The target amplitude setting circuit 72a' is controlled by the CPU 40 to set a target amplitude. The target amplitude setting circuit 72a' sets the target amplitude for reproducing, and the target amplitude for recording, individually. The speed setting circuit 73a' is controlled by the CPU 40 to set a response speed to the input signal for the VCA circuit 68a'. In the same manner as the case of the first constant voltage AGC 57a, the response speed is set by the speed setting circuit 73a' such that the response speed set for immediately after the switching between the recording operation and the reproducing operation is carried out is higher than the response speed set for the other period. The filtering circuit 69a' removes the high frequency component from the signal output from the VCA circuit 68a'. The amplitude detection circuit 70a' detects the amplitude of the signal output from the filtering circuit 69a'. The gain setting circuit 71a' sets the gain of the VCA circuit 68a' such that the amplitude detected by the amplitude detection circuit 70a' becomes equal to the target amplitude set by the target amplitude setting circuit 72a'. At the response speed set by the speed setting circuit 73a', the VCA circuit 68a' adjusts the amplitude of the signal S2a output from the first sample signal adjustment circuit 52a, by using the gain set by the gain setting circuit 71a'. Accordingly, by adjusting the target amplitude, the wave form of the signal S6a' output from the third constant amplitude AGC 57a' can be made to be the same as the wave form of the signal S6a output from the first constant voltage AGC 57a. In the same manner, a fourth constant amplitude AGC 57b' including a VCA circuit 68b', a filtering circuit 69b', an amplitude detection circuit 70b', a gain setting circuit 71b', a target amplitude setting circuit 72b', and a speed setting circuit 73b' (which are not shown) may be used instead of the second constant voltage AGC 57b.

Next, a wobble signal detection process performed by the wobble signal detection circuit 30 will be described.

The CPU 40 makes various settings of the wobble signal detection circuit 30 before starting the wobble signal detection process. A flow chart shown in FIG. 10 corresponds to a series of algorithms executed by the CPU 40.

At step 401, it is determined whether or not the optical disk 15 is the pigment type medium. If the optical disk 15 is not the pigment type medium, the procedure proceeds to step 403. The pigment type medium can be distinguished from the phase change type medium, based on the intensity of the light reflected by the recording surface of the optical disk 15. The reflectance of the pigment type medium such as the DVD+R is about 80% while the reflectance of the phase change medium such as the DVD+RW is about 30%.

At step 403, the circuit selector 61 is instructed by the CPU 40 to select the signal S9b output from the first subtracting unit 60. Then, the setting procedure terminates.

On the other hand, if at step 401, it is determined that the optical disk 15 is the pigment type medium, the procedure proceeds to step 405.

At step 405, the circuit selector 61 is instructed by the CPU 40 to select the signal S9a output from the arithmetic circuit 90.

Subsequently, at step 407, it is determined whether or not the recording of information is the purpose for accessing optical disk 15. If the recording of the information is not the purpose for accessing the optical disk 15, the procedure proceeds to step 409.

At step 409, the amplitude adjustment circuits 64a and 64b are instructed by the CPU 40 to set the gain to be gain G1.

Subsequently, at step 411, the target voltage setting circuits 72a and 72b are instructed by the CPU 40 to set the target voltage to be the target voltage Vs.

Then, at step 413, the output signal switch 67a is instructed by the CPU 40 to carry out the switching operation such that the signal output from the amplitude adjustment circuit 64a is output as the signal S2a from the first sample signal adjustment circuit 52a. Furthermore, at step 413, the output signal switch 67b is instructed by the CPU 40 to carry out the switching operation such that the signal output from the amplitude adjustment circuit 64b is output as the signal S2b from the second sample signal adjustment circuit 52b. In the flow chart, the procedure proceeds to step S415.

At step 415, the signal selecting circuit 56a is instructed by the CPU 40 to select the signal S6a output from the first constant voltage AGC 57a. In addition, at step 415, the second signal selecting circuit 56b is instructed by the CPU 40 to select the signal S6b output from the second constant voltage AGC 57b.

At step 419, the signal selector 55b is instructed to select the signal S8a output from the second subtracting unit 58a. Then, the setting process terminates.

On the other hand, if at step 407, it is determined that the recording of the information is the purpose for accessing the optical disk 15, the procedure proceeds to step 421.

At step 421, the amplitude adjustment circuits 64a and 64b are instructed by the CPU 40 to set the gain to be the gain G2.

Subsequently, at step 423, the target voltage setting circuits 72a and 72b are instructed by the CPU 40 to set the target voltage to be the target voltage Vk.

At step 425, it is determined whether or not the wobble signal is detected based on the only the signal generated at the time of forming the space region. This determination may be made in accordance with the instruction provided from the host device. If it is determined that the wobble signal is detected based on the only signal generated at the time of forming the space region, the procedure proceeds to step 427.

At step 427, the output signal switch 67a is instructed by the CPU 40 to carry out the switching operation such that the signal output from the amplitude adjustment circuit 64a is output as the signal S2a from the first sample signal adjustment circuit 52a. In addition, at step 427, the output signal switch 67b is instructed by the CPU 40 to carry out the switching operation such that the signal output from the amplitude adjustment circuit 64b is output as the signal S2b from the second sample signal adjustment circuit 52b.

Subsequently, at step 429, the first signal selecting circuit 56a is instructed by the CPU 40 to select the signal S6a output from the first constant voltage AGC 57a. Furthermore, at step 429, the second signal switching circuit 56b is instructed by the CPU 40 to select the signal S6b output from the second constant voltage AGC 57b.

Then, at step 433, the signal selector 55b is instructed by the CPU 40 to select the signal S8a output from the second subtracting unit 58a, and the procedure terminates.

Meanwhile, when at step 425, in accordance with the instruction from the host device, the wobble signal is detected based on both the signal generated at the time of forming the space region and the signal generated at the time of forming the mark region, the procedure proceeds to step 435 from the step 425.

At step 435, the output signal switch 67a is instructed by the CPU 40 to carry out the switching operation such that the signal output from the DC component removing circuit 66a is output as the signal S2a from the first sample signal adjustment circuit 52a. In addition, at step 435, the output signal switch 67b is instructed by the CPU 40 to carry out the switching operation such that the signal output from the DC component removing circuit 66b is output as the signal S2b from the second sample signal adjustment circuit 52b.

Next, at step 437, it is determined whether or not the switching between the signal generated at the time of forming the space region and the signal generated at the time of forming the mark region is performed for detecting the wobble signal. If the switching between the signal generated at the time of forming the space region and the signal generated at the time of forming the mark region is performed in accordance with the instruction from the host device, the procedure proceeds to step 439.

At step 439, the signal selector 55b is instructed by the CPU 40 to select the signal S8c output from the switching unit 55a, and the procedure terminates.

On the other hand, if at step 437, in accordance with the instruction from the host device, the signal generated at the time of forming the space region and the signal generated at the time of forming the mark region are added without performing the switching between the signal generated at the time of forming the space region and the signal generated at the time of forming the mark region, the procedure proceeds to step 441 from step 437.

At step 441, it is determined whether or not the signal selector 55b selects the signal S8a output from the second subtracting unit 58a. When in accordance with the instruction from the host device, the signal selector 55b does not select the signal S8a output from the second subtracting unit 58a, the procedure proceeds to step 443.

At step 443, the signal selector 55b is instructed by the CPU 40 to select the signal S8b output from the third adder 54c, and the setting procedure terminates.

Meanwhile, if at step 441, in accordance with the instruction provided from the host device, the signal selector 55b selects the signal S8a output from the second subtracting unit 58a, the procedure proceeds to step 445.

At step 445, the first signal selecting circuit 56a is instructed by the CPU 40 to select the signal S4a output from the first adder 54a. Furthermore, at step 445, the second signal selecting circuit 56b is instructed by the CPU 40 to select the signal S4b output from the second adder 54b.

During the recording operation, the CPU 40 instructs the speed setting circuits 73a and 73b to set the predetermined speeds.

Figure 11:
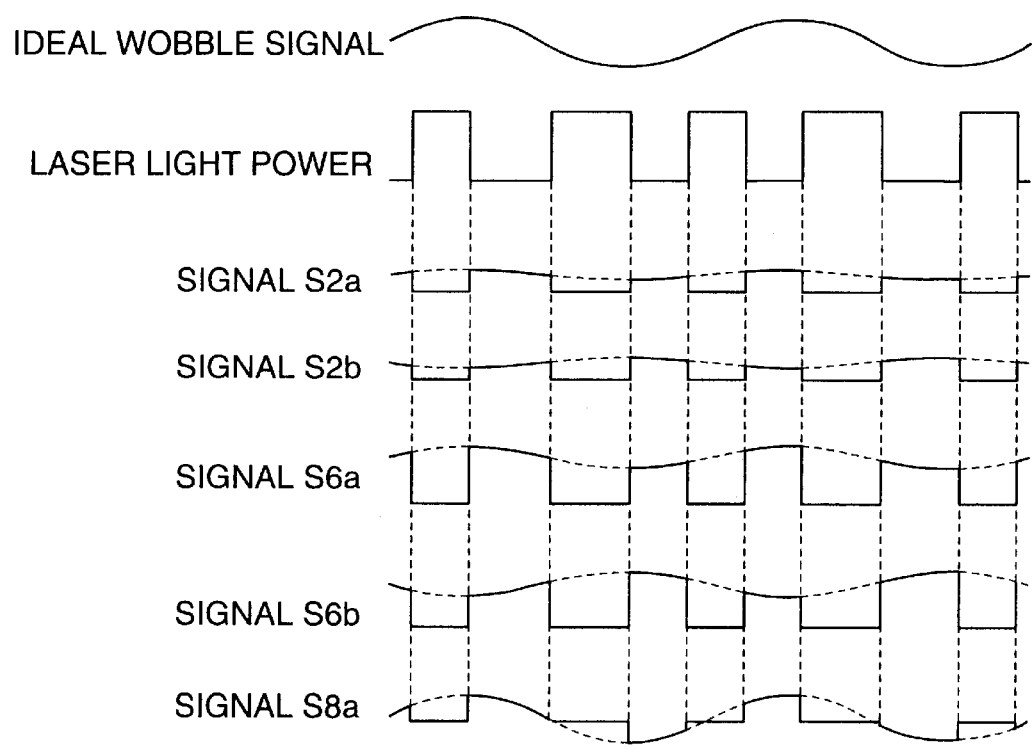
FIG. 11 shows a part of wave forms of signals in the wobble signal detection circuit when the wobble signal detection circuit detects a wobble signal based on only signals generated at the time of forming a space region during a period for recording information on a pigment type recording medium.

Next, the process performed by the wobble signal detection circuit 30 will be described. As shown in FIG. 11, the wobble signal that is not affected by the changes in power of the laser light is shown as an ideal wobble signal.

Examples of the wobble signal detection process during a period for recording information on the pigment type medium will be described in the following.

1. First Example

The first example is directed to the case in which the wobble signal is detected based on the only signal generated when forming the space region. It is assumed that the CPU 40 has already made the setting for this case on the wobble signal detection circuit 30. Furthermore, it is assumed that the laser light power has the rectangular pulse form corresponding to the data to be recorded, as shown in FIG. 11 for simplicity. However, in reality, the laser light power has a complicated form.

In sync with the timing signal provided from the laser controlling circuit 24, the first space sample circuit 51a samples the signal component of the signal Sc at the time of forming the space region, and outputs the sampled signal component to the first sample signal adjustment circuit 52a. In addition, in sync with timing signal provided from the laser controlling circuit 24, the second space sample circuit 51b samples the signal component of the signal Sd at the time of forming the space region, and outputs the sampled signal component to the second sample signal adjustment circuit 52b. The amplitude adjustment circuit 64a in the first sample signal adjustment circuit 52a adjusts the amplitude of the signal S1a output from the first space sample circuit 51a by using the gain G2. Then, via the output signal switch 67a, the first sample signal adjustment circuit 52a outputs this adjusted signal S2a that has a pulse form shown in FIG. 11 as one example. In the same manner, the amplitude adjustment circuit 64b in the second sample signal adjustment circuit 52b adjusts the amplitude of the signal S1b output from the second space sample circuit 51b by using the gain G2. Then, the second sample signal adjustment circuit 52b outputs the adjusted signal S2b that has a wave form shown in FIG. 11 as one example.

The first constant voltage AGC 57a adjusts the signal S2a such that the average DC voltage of the signal S2a becomes the target voltage Vk. Then, the first constant voltage AGC 57a outputs, to the first signal selecting circuit 56a, the adjusted signal as the signal S6a that has the wave form shown in FIG. 11 as one example. The second constant voltage AGC 57b adjusts the signal S2b such that the average DC voltage of the signal S2b becomes the target voltage Vk. Then, the second constant voltage AGC 57b outputs, to the second signal selecting circuit 56b, the adjusted signal as the signal S6b that has the wave form shown in FIG. 11 as one example.

The first signal selecting circuit 56a selects the signal S6a output from the first constant voltage AGC 57a, and outputs the selected signal S6a to the second subtracting unit 58a.

The second signal selecting circuit 56b selects the signal S6b output from the second constant voltage AGC 57b, and outputs the selected signal S6b to the second subtracting unit 58a.

The second subtracting unit 58a subtracts the signal S7b (equal to the signal S6b) output by the second signal selecting circuit 56b from the signal S7a (equal to the signal S6a) output by the first signal selecting circuit 56a. The second subtracting unit 58a outputs, to the signal selector 55b, the subtracted signal as the signal S8a that has the wave form of FIG. 11 as one example.

The signal selector 55b selects the signal S8a output from the second subtracting unit 58a, and outputs the selected signal as the signal S9a. The circuit selector 61 selects the signal S9a, and outputs the selected signal as the signal S10. The band limitation circuit 62 extracts the wobble signal component from the signal S10. The two-valued variable circuit 72 converts the extracted wobble signal component into the two-valued variable, and outputs the converted two-valued variable as the wobble signal to the decoder 31.

2. Second Example

The second example is directed to the case in which the wobble signal is detected based on both the signal generated at time of forming the space region and the signal generated at the time of forming the mark region. It is assumed that the switching between the signal generated at the time of forming space region and the signal generated at the time of forming mark region is not carried out, the signal selector 55b selects the signal S8b, and the CPU 40 has already made setting for this case on the wobble signal detection circuit 30.

In sync with the timing signal output from the laser controlling circuit 24, the first space sample circuit 51a samples the signal component of the signal Sc generated at the time of forming the space region. The first space sample circuit 51a then outputs the sampled signal component to the first sample signal adjustment circuit 52a. On the other hand, in sync with the timing signal provided from the laser controlling circuit 24, the second space sample circuit 51b samples the signal component of the signal Sd generated at the time of forming the space region. The second space sample circuit 51b outputs the sampled signal component to the second sample signal adjustment circuit 52b.

In the first sample signal adjustment circuit 52a, the amplifier 65a amplifies the signal S1a output from the first space sample circuit 51a, and the DC component removing circuit 66a removes the DC component from the amplified signal. Via the output signal switch 67a, the first sample signal adjustment circuit 52a outputs the signal S2a provided from the amplifier 65a that has the wave form shown in FIG. 12 as one example. In the same manner, in the second sample signal adjustment circuit 52b, the amplifier 65b amplifies the signal S1b, and the DC component removing circuit 66b removes the DC component from the amplified signal. Via the output signal switch 67b, the second sample signal adjustment circuit 52b outputs the signal S2b provided from the DC component removing circuit 66b that has the wave form shown in FIG. 12.

Figure 12:
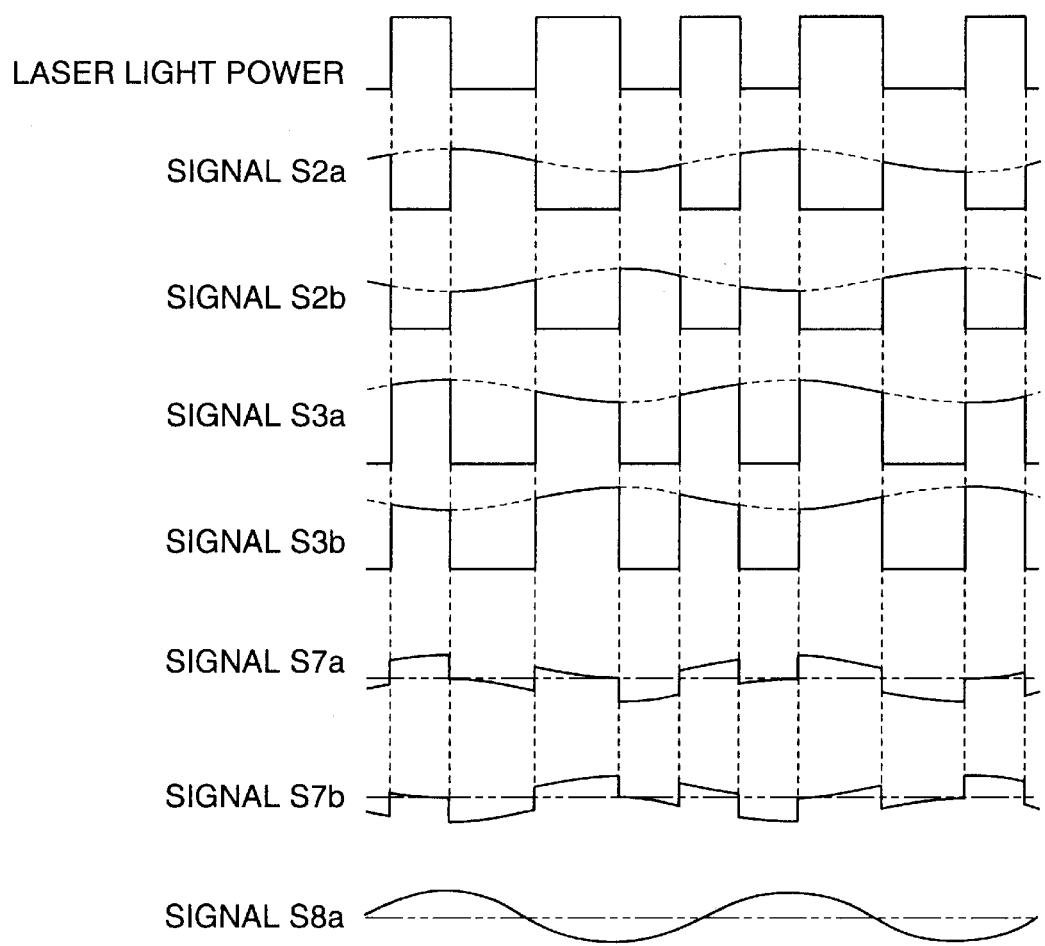
FIG. 12 shows a part of wave forms of signals in the wobble signal detection circuit when the wobble signal detection circuit detects a wobble signal based on signals generated at the time of forming a space region and signals generated at the time of forming a mark region during a period for recording information on a pigment type recording medium.
Figure 13:
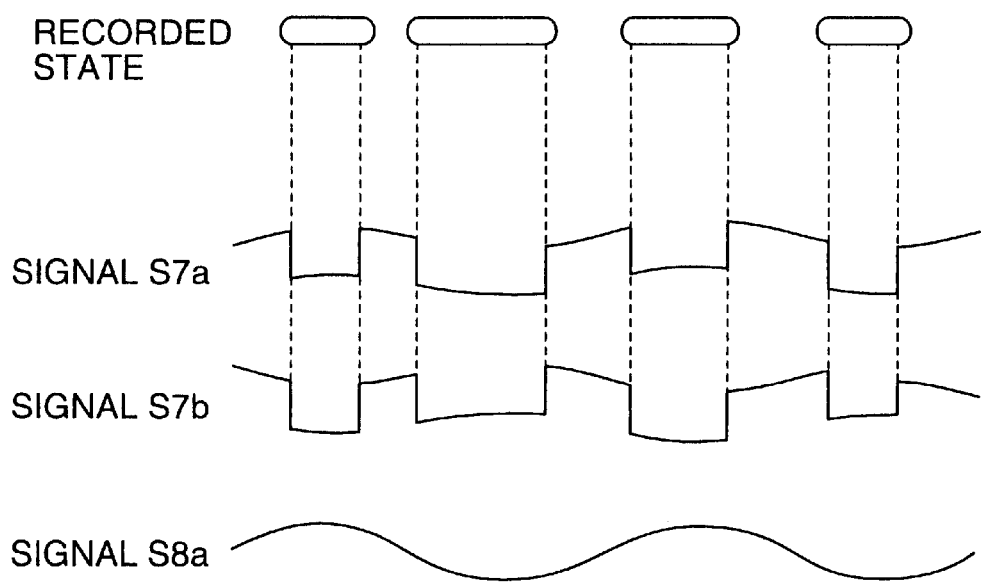
FIG. 13 shows a part of wave forms of signals in the wobble signal detection circuit when the optical disk device shown in FIG. 2 reproduces information recorded on the pigment type recording medium.

Meanwhile, the AC combining circuit 53a removes the DC component from the signal Sc, and then outputs the signal S3a that has the wave form shown in FIG. 12 as one example. The second AC combining circuit 53b removes the DC component from the signal Sd, and then outputs the signal S3b that has the wave form shown in FIG. 12 as one example.

The third subtracting unit 58b outputs the signal that is the difference in level between the signal S3a and the signal S3b. The fourth subtracting unit 58c outputs the signal that is the difference in the level between the signal S2a and the signal S2b.

The third adder 54c adds the signal output from the third subtracting unit 58b and the signal output from the fourth subtracting unit 58c, and then outputs the added signal as the signal S8b.

The signal selector 55b selects the signal S8b output from the third adder 54c, and outputs the selected signal as the signal S9a. The circuit selector 61 selects the signal S9a output from the signal selector 55b, and outputs the selected signal as the signal S10. The band limitation circuit 62 extracts the wobble signal component from the signal S10. Thereafter, the two-valued variable circuit 72 converts the extracted wobble signal component into the two-valued variable, and outputs the two-valued variable as the wobble signal to the decoder 31.

3. Third Example

The third example is directed to the case in which by the instruction provided from the host device, the wobble signal is detected based on both the signal generated at the time of forming the space region and the signal generated at the time of forming the mark region. It is assumed that the switching between the signal generated at the time of forming the space region and the signal generated at the time of forming the mark region is not carried out, the signal selector 55b selects the signal S8a, and the CPU 40 has already made setting adjusted to this case on the wobble signal detection circuit 30.

The processes other than the processes performed at the arithmetic circuit 90 are the same as the processes performed in the second example. In this example, the only processes performed at the arithmetic circuit 90 will be described.

The first adder 54a adds the signal S2a and the signal S3a, and outputs the added signal as the signal S4a to the first signal selecting circuit 56a. The second adder 54b adds the signal S2b and the signal S3b, and outputs the added signal as the signal S4b to the second signal selecting circuit 56b.

The first signal selecting circuit 56a selects the signal S4a output from the first adder 54a, and outputs the selected signal as the signal S7a to the second subtracting unit 58a. On the other hand, the second signal selecting circuit 56b selects the signal S4b output from the second adder 54b, and outputs the selected signal as the signal S7b to the second subtracting unit 58a.

The second subtracting unit 58a outputs, to the signal selector 55b, the signal S8a that is the difference in level between the signal S7a and the signal S7b. The signal selector 55b selects the signal S8a output from the second subtracting unit 58a.

4. Fourth Example

The fourth example is directed to the case in which by instruction provided from the host device, the wobble signal is detected based on the signal generated at the time of forming the space region and the signal generated at the time of forming the mark region. It is assumed that the signal switching between the signal generated at the time of forming the space region and the signal generated at the time of forming the mark region is carried out, by the instruction from the host device, and the CPU 40 has already made the setting adjusted to this case on the wobble signal detection circuit 30.

The processes other than the processes performed at the arithmetic circuit 90 are the same as the processes performed in the second case. The only processes performed at the arithmetic circuit 90 will be described.

The third subtracting unit 58b outputs the signal that is the difference in level between the signal S3a and the signal S3b. The fourth subtracting unit 58c outputs the signal that is the difference in level between the signal S2a and the signal S2b.

In sync with the timing signal provided from the laser controlling circuit 24, the switching unit 55a selects the signal output from the third subtracting unit 58b during a period for forming the mark region, and selects the signal output from the fourth subtracting unit 58c during a period for forming the space region. The switching unit 55a then outputs the selected signal as the signal S8c.

The signal selector 55b selects the signal S8c output from the switching unit 55a, and outputs the selected signal as the signal S9a.

An example of the wobble signal detection process during recording on the phase change type medium will be described.

1. Example

It is assumed that the CPU 40 already made the setting on the wobble signal detection circuit 30. In other words, in the wobble signal detection circuit 30, the second signal extraction circuit 30b is selected.

The first constant amplitude AGC 59a adjusts the signal Sc so that the amplitude of the signal Sc can become a predetermined value, and outputs the adjusted signal to the first subtracting unit 60. The second constant amplitude AGC 59b adjusts the signal Sd so that the amplitude of the signal Sd can become the predetermined value, and outputs the adjusted signal to the first subtracting unit 60.

The first subtracting unit 60 subtracts the signal S1d output by the second constant amplitude AGC 59b from the signal S1c output by the first constant amplitude AGC 59a, and outputs the, subtracted signal as the signal S9b to the circuit selector 61. The circuit selector 61 outputs, to the band limitation circuit 62, the signal S9b as the signal S10 output from the first subtracting unit 60. The band limitation circuit 62 extracts the wobble signal component from the signal S10. The two-valued variable circuit 72 converts the extracted wobble signal component into the two-valued variable, and outputs the two-values variable as the wobble signal to the decoder 31.

An example of wobble signal detection process during a period for reproducing information on the pigment type medium will be described.

1. Example

It is assumed that the CPU 40 has already made the setting on the wobble signal detection circuit 30.

The first space sample circuit 51a outputs the signal Sc as it is to the first sample signal adjustment-circuit 52a. The second space sample circuit 51b outputs the signal Sd as it is to the second sample signal adjustment circuit 52b.

In the sample signal adjustment circuit 52a, the amplitude adjustment circuit 64a adjusts the amplitude of the signal S1a equal to the signal Sc output from the first space sample circuit, by using the gain G1. Then the first sample signal adjustment circuit 52a outputs the adjusted signal as the signal S2a via the output signal switch 67a. In the same manner, in the second sample signal adjustment circuit 52b, the amplitude adjustment circuit 64b adjusts the amplitude of the signal S1b equal to the signal Sd output from the second space sample circuit 51b. The second sample signal adjustment circuit 52b outputs the adjusted signal as the signal S2b via the output signal switch 67b.

The first constant voltage AGC 57a adjusts the signal S2a output from the first sample signal adjustment circuit 52a so that the average DC voltage of the signal S2a can become the target voltage Vs. The first constant voltage AGC 57a outputs, to the first signal selecting circuit 56a, the adjusted signal as the signal S6a (that is equal to the signal S7a having the wave form shown in FIG. 13 as one example). The second constant voltage AGC 57b adjusts the signal S2b output from the second sample signal adjustment circuit 52b so that the average DC voltage of the signal S2b can become the target voltage Vs, The second constant voltage AGC 57b then outputs, to the second signal selecting circuit 56b, the adjusted signal as the signal S6b (that is equal to the signal S7a having the wave form shown in FIG. 13 as one example).

The first signal selecting circuit 56a selects the signal S6a output from the first constant voltage AGC 57a, and outputs the selected signal as the signal S7a to the second subtracting unit 58a. The second signal selecting circuit 56b selects the signal S6b output from the second constant voltage AGC 57b, and outputs the selected signal as the signal S7b to the second subtracting unit 58a.

The second subtracting unit 58a subtracts the signal S7b output by the second signal selecting circuit 56b from the signal S7a output by the first signal selecting circuit 56a. The second subtracting unit 58a outputs, to the signal selector 55b, the subtracted signal as the signal S8a that has the wave form shown in FIG. 13 as one example.

The signal selector 55b selects the signal S8a output form the second subtracting unit 58a, and outputs the selected signal as the signal S9a. The circuit selector 61 selects the signal S9a output from the signal selector 55b, and outputs the selected signal as the signal S10. The band limitation circuit 62 extracts the wobble signal component from the signal S10. The two-valued variable circuit 72 converts the extracted wobble signal component into the two-valued variable, and outputs the two-valued variable to the decoder 31.

Next, the processes for recording data on the optical disk 15 by using the optical disk device 20 will be described.

When the CPU 40 receives the recording request from the host device via the interface 38, the CPU 40 outputs, to the motor driver 27, the control signal for controlling the rotation of the spindle motor 22.

The wobble, signal detection circuit 30 detects the wobble signal based on the signals Sc and Sd provided from the optical pickup 23, and outputs the detected wobble signal to the decoder 31. The decoder 31 extracts the ADIP information from the wobble signal, and reports the ADIP information to the CPU 40. When the decoder 31 determines that the ADIP information includes an error based on the error detection code or the like attached to the ADIP information, the decoder 31 reports the detection error of the ADIP information to the CPU 40. The CPU 40 measures the detection error rate of the ADIP information, and when the detection error rate of the ADIP information is larger than a predetermined value, the CPU 40 stops the data recording operation, and reports this fact to the host device.

The error detection circuit 83 detects the focusing error signal and the tracking error signal based on the signal output from the optical pickup unit 23, and outputs the detected focusing error signal and tracking error signal to the servo controller 33. The servo controller 33 drives the focusing actuator and the tracking actuator of the optical pickup unit 23 based on the focusing error signal and the tracking error signal output from the error signal detection circuit 83 in order to correct focusing deviation and tracking deviation.

When the CPU 40 receives data from the host device, the CPU 40 causes the buffer RAM 34 to store the data via the buffer manager 37. When an amount of the data accumulated in the buffer RAM 34 becomes larger than a predetermined value, the Buffer manager 37 reports this fact to the CPU 40.

When the CPU 40 receives this report, the CPU 40 instructs the encoder 25 to prepare data to be recorded on the optical disk 15. The encoder 25 obtains the data from the buffer RAM 34, adds the error correction code to the obtained data, and prepares the data to be recorded on the optical disk 15.

Based on the ADIP information provided from the decoder 31, the CPU 40 outputs, to the motor driver 27, a signal for causing the motor driver 27 to perform the seeking operation for the optical pickup unit 23 so that the optical pickup unit 23 can be positioned at a predetermined position for starting the recording operation.

When based on the ADIP information, the CPU 40 determines that the optical pickup unit 23 is positioned where the recording operation starts, the CPU 40 reports this fact to the encoder 25. The encoder 25 provides the data to be recorded to the optical pickup unit 23 via the laser controlling circuit 24 so that the data can be recorded on the optical disk 15. The encoder 25 performs the operation acting in line with the rotation of the spindle motor 22, in accordance with the synchronizing signal provided from the decoder 31. In this manner, the recording can be carried out at the accurate position.

When the operation switching between the recording and the reproducing is carried out, the CPU 40 controls the speed setting circuits 73a and 73b so that the response speeds of the constant voltage AGCs 57a and 57b can become VRf. During the recording or reproducing operation, the CPU 40 controls the speed setting circuits 73a and 73b so that the response speeds of the constant voltage AGCs 57a and 57b can become VRs, in order to slow the response speeds of the constant voltage AGCs 57a and 57b. Alternatively, instead of the CPU 40, the encoder 25 may control the speed setting circuits 73a and 73b.

The processes when the optical disk device 20 reproduces the data recorded on the optical disk 15 will be described.

When the CPU 40 receives the reproducing request from the host device, the CPU 40 outputs, to the motor driver 27, a control signal for controlling the rotation of the spindle motor 22 based on the reproducing speed.

The wobble signal detection circuit 30 detects the wobble signal based on the signal Sc and the signal Sd provided from the optical pickup unit 23, and outputs the detected wobble signal to the decoder 31. The decoder 31 extracts the ADIP information from the wobble signal, and provides the extracted ADIP information to the CPU 40. When, based on the error detection code or the like attached to the ADIP information, the decoder 31 determines that ADIP information includes an error, the decoder 31 reports the error detection in the ADIP information to the CPU 40. The CPU 40 measures the error rate of the error detected in the ADIP information, and when the error rate becomes larger than a predetermined value, the CPU 40 stops the data reproducing operation, and reports this fact to the host device.

The error signal detection circuit 83 detects the focusing error signal and the tracking error signal based on the signal output from the optical pickup unit 23, and outputs the detected focusing error signal and tracking error signal to the servo controller 33. Based on the focusing error signal and the tracking error signal provided from the error signal detection circuit 83, the servo controller 33 droves the focusing actuator and the tracking actuator of the optical pickup unit 23 via the motor driver 27, in order to correct focusing deviation and tracking deviation.

The CPU 40 outputs a signal for causing the motor driver 27 to perform the seeking operation so that the optical pickup unit 23 can be positioned at a predetermined position for staring the reading operation.

The CPU 40 determines whether or not the optical pickup unit 23 is positioned where the reading operation starts. When the CPU 40 determines that the optical pickup unit 23 is positioned at the reading operation start position, the CPU 40 reports this fact to the RF signal detection circuit 82. The RF signal detection circuit 82 detects a RF signal based on the signal output from the optical pickup unit 23, and outputs the detected RF signal to the decoder 31. The decoder 31 performs the error correction process or the like on the RF signal.

When the data recorded on the optical disk are music data, the D/A converter 36 converts the data output from the decoder 31 into analog data, and outputs the analog data to the audio equipment or the like.

On the other hand, when the data recorded on the optical disk 15 are the data other than the music data, the decoder 31 performs the error check process, the error correction process, and the like. Thereafter, the data processed by the decoder 31 are accumulated in the buffer RAM 34.

When an amount of the data accumulated in the RAM 34 reaches the amount of the sector data, the buffer manager 37 forwards the data to the host device via the interface 38.

According to the embodiment of the present invention, a processing device of the optical pickup device 20 may be configured so as to include the CPU 40, the encoder 25, and the laser controlling circuit 24.

Furthermore, with the wobble signal detection circuit of the above-described embodiment, at the time of recording data on the optical disk 15, the first space sample circuit 51a samples the voltage signal Sc in sync with the timing signal provided from the laser controlling circuit 24. The voltage signal Sc corresponds to the signal provided from the third light receiving element 80c that has been converted into the electric signal from the light signal. Then, the signal including the wobble signal generated during the period in which the space region is formed can be extracted from the voltage signal Sc. In the same manner, in sync with the timing signal, the second space sample circuit 51b samples the voltage signal Sd corresponding to the signal provided from the fourth light receiving element 80d that has been converted into the electric signal from the light signal. Thereby, the signal including the wobble signal generated during the period in which the space region is formed can be extracted from the voltage signal Sd. In this case, the signal during the period in which the laser power is small and stabilized is extracted. The first constant voltage AGC 57a adjusts the signal level so that the average voltage of the signal from the first space sample circuit 51a can become equal to the target voltage. The second constant voltage AGC 57b adjusts the signal level so that the average voltage of the signal from the second space sample circuit 51b can become equal to the target voltage. In this case, since the average voltage of the sampled signal is much smaller than the target voltage, the signal is adjusted by using the large gain. In this manner, during the period for forming the space region, in high accuracy, it is possible to extract the wobble signal component that, in the prior art, cannot be adequately distinguished from the noise by the signal adjustment of a conventional constant amplitude AGC circuit. The second subtracting unit 58a outputs, as the wobble signal, the difference in level between the signal output from the first constant voltage AGC 57a and the signal output from the second constant voltage AGC 57b. In this manner, the wobble signal is amplified. Accordingly, even when the only signal generated at the time of forming the space region is used, it is possible to detect the wobble signal in high accuracy. Furthermore, according to the embodiment of the present invention, the wobble signal is detected by extracting the wobble signal component during the period for forming the space region. Accordingly, as in the case of the DVD+R, even when the laser light power for forming the mark region is much larger than the laser light power for forming the space region, accuracy in the wobble signal detection is not affected by the difference of the laser light powers. Of course, when the laser light power for forming the mark region is not much larger than the laser light power for forming the space region, the wobble signal of plural types of optical recording media can be detected in high accuracy. In addition, the same target voltage is set to the first constant voltage AGC 57a and the second constant voltage AGC 57b. Accordingly, even when the light reflected from the surface of the optical disk 15 is received at the position deviating from the centers of the light receiving elements, it is possible to detect the wobble signal in high accuracy.

According to the embodiment of the present invention, the amplitude adjustment is performed on the signal output from the space sample circuit such that the gain used at the time of recording is different from the gain used at the time of reproducing. Since the laser light power for reproducing the data is largely different from the laser light power for recording data, the amplitude of the signal output from the space sample circuit at the time of reproducing is largely different from the amplitude of the signal output from the space sample circuit at the time of recording. For this reason, depending on the data reproducing and the data recording, the gains are set such that the amplitudes of the signals output from the space sample circuit become a predetermined value. In this manner, it is possible to effectively use the dynamic ranges of the first constant voltage AGC 57a and the second constant voltage AGC 57b, and to detect the wobble signal in high accuracy in both the reproducing and the recording. The amplitude adjustment circuits 64a and 64b may be arranged respectively at upper stream of the space sample circuits 51a and 51b, with respect to the signal flow from the optical pickup unit 23.

According to the embodiment of the present invention, the CPU 40 controls the constant voltage AGC so that the target voltage set by the target voltage setting circuit at the time of data reproducing can be different from the target voltage set by the target voltage setting circuit at the time of data recording. Since the amplitude of the signal output from the optical pickup unit 23 at the time of data reproducing is usually larger than the amplitude of the signal output from the optical pickup unit 23 at the time of data recording, when the same target voltage is set for the data reproducing and the data recording, the amplified rate of the output signal at the time of the data recording becomes larger than the amplified rate of the output signal at the time of the data reproducing. In other words, the amplitude of the wobble signal at the time of the data recording becomes larger than the amplitude of the wobble signal at the time of the data reproducing. The large amplitude of the wobble signal component is not necessarily advantageous, that is, the wobble signal component needs to be detected at a predetermined amplitude in order to extract the accompanying information such as the ADIP information in high accuracy. By taking this into account, according to the embodiment of the present invention, the target voltage for the data recording that is different from the target voltage for the data reproducing is set so that the wobble signal component amplitude during the data recording can become approximately equal to the wobble signal component amplitude during the data reproducing. In this manner, it is possible to detect the wobble signal in high accuracy during both the data recording and the data reproducing. Since the target voltage for the data recording is set such that the level of the wobble signal detected during the data recording becomes approximately equal to the level of the wobble signal detected during the data reproducing, it is possible to prevent the detection error of the wobble signal immediately after the switching between the recording operation and the reproducing operation. In other words, it is possible to detect the stable wobble signal in high accuracy.

In addition, according to the embodiment of the present invention, the CPU 40 controls the constant voltage AGC so that the target speed setting circuit of the constant voltage AGC can set the response speed VRf used for immediately after the switching between the recording operation and the reproducing operation is carried out, and the target speed setting circuit can set the response speed VRs used for after the recording operation or the reproducing operation is started. The response speed VRs is lower than the response speed VRf. In this manner, even when at the early stage of the wobble signal detection circuit, the level of the wobble signal detected during the recording operation is different from the level of the wobble signal detected during the reproducing operation, it is possible to detect the wobble signal in the stable state immediately after the switching between the recording operation and the reproducing operation. Furthermore, during the recording operation, since the slower response speed is set, it is possible to prevent the operation from being affected by the change in the signal amplitude caused by the scratch on the optical disk 15. Accordingly, it is possible to detect the wobble signal in high accuracy in a stable manner.

Furthermore, according to the present invention, the optical disk device 20 records information on the optical disk 15, the amplifiers 65a and 65b amplify the amplitudes of the signals output from the space sample circuits 51a and 51b such that the signal levels of the wobble signals included in the signals output from the space sample circuit 51a and 51b are the same both at the time of forming the space region and at the time of forming the mark region. The first adder 54a adds the signal amplified by the amplifier 65a and the voltage signal Sc provided from the third light receiving element 80c, and the second adder 54b adds the signal amplified by the amplifier 65b and the signal Sd provided from the fourth light receiving element 80d. In this manner, the signal levels of the added wobble signal components can be approximately the same both at the time of forming the space region and at the time of forming the mark region. Furthermore, the second subtracting unit 54b outputs the signal that is difference in level between the signal output by the first adder 54a and the signal output by the second adder 54b. Accordingly, the wobble signal output from the second subtracting unit 58a can be accurate and stable.

According to the embodiment of the present invention, when the optical disk device 20 records information on the optical disk 15, the fourth subtracting unit 58c outputs the signal that is the difference in level between the signal amplified by the amplifier 65a and the signal amplified by the amplifier 65b to output the wobble signal generate at the time of forming the space region. On the other hand, the third subtracting unit 58b outputs the signal that is the difference in level between the signal Sc provided by the third light receiving element 80c and the signal Sd provided by the fourth light receiving element 80d so as to output the wobble signal generated at the time of forming the mark region. In addition, the third adder 54c adds the signal output from the third subtracting unit 58b and the signal output from the fourth subtracting unit 58c so as to add the wobble signal generated at the time of forming the space region and the wobble signal generated at the time of forming the mark region. As a result, the wobble signal output from the third adder 54c can be accurate and stable.

According to the embodiment of the present invention, when the optical disk device 20 records information on the optical disk 15, the switching unit 55a selects the signal output from the fourth subtracting unit 58c at the time of forming the space region, and selects the signal output from the third subtracting unit 58b at the time of forming the mark region, in sync with the timing signal provided from the laser controlling circuit 24. The switching unit 55a outputs the selected signal. That is, the wobble signal generated at the time of forming the space region is combined with the wobble signal generated at the time of forming the mark region. In this manner, it is possible to prevent the noise generation caused by the circuit response delay and the ambiguity of the wave form when the operation is switched between the forming of the space region and the forming of the mark region. As a result, the wobble signal output from the switching unit 55a can have high accuracy and stability.

Furthermore, according to the embodiment of the present invention, when the average voltage input to the arithmetic circuit 90 largely deviates from the reference voltage, the arithmetic circuit needs to have a very wide dynamic range. In addition, when the signals Sc and Sd output from the optical pickup unit 23 are different from each other, the offset is generated in the detected wobble signal. However, in the embodiment of the present invention, since the AC combining circuits 53a and 53b, and the DC component removing circuits 66a and 66b are disposed at the upstream side of the arithmetic circuit 90, it is not necessary to largely widen the dynamic range of the arithmetic circuit 90. Further, as a result, even when the signal levels of the signals Sc and Sd output from the optical pickup unit 23 are largely different from each other, the offset is not generated in the detected wobble signal. Accordingly, it is possible to realize the mass production of the arithmetic circuits at the cheap cost by using electronic components put on the market.

According to the embodiment of the present invention, when the optical disk 15 is the pigment type medium, the circuit selector 61 selects the first signal extraction circuit 30a, and when the optical disk 15 is the medium other than the pigment type medium, the circuit selector 61 selects the second signal extraction circuit 30b. In this manner, the optimum circuit configuration can be selected depending on the type of the optical disk 15, so that the wobble signal can be detected in high accuracy in accordance with the plural types of the optical disks.

Furthermore, according to the embodiment of the present invention, the third constant amplitude AGC 57a' may be used instead of the first constant voltage AGC 57a, and the fourth constant amplitude AGC 57b' may be used instead of the second constant voltage AGC 57b. The target amplitude setting circuits 72a' and 72b' set the target amplitudes of the constant amplitude AGCs 57a' and 57b', individually. For example, the target amplitude setting circuits 72a' and 72b' set the target amplitude for the data recording so that the signal level of the wobble signal generated during the data recording can be approximately equal to the signal level of the wobble signal generated during the data reproducing. In this manner, it is possible to prevent the error in the wobble signal detection immediately after the switching between the recording operation and the reproducing operation is performed. In other words, the wobble signal that has high accuracy and stability can be detected. In accordance with the control signal, the speed setting circuits 73a' and 73b' set the response speeds to the input signals so that the response speed immediately after the switching between the recording operation and the reproducing operation can be larger than the response speed during the recording operation. Accordingly, even when the signal level of the wobble signal detected during the recording operation is different from the signal level of the wobble signal detected during the reproducing operation, the wobble signal having high accuracy can be detected immediately after the switching between the recording operation and the reproducing operation is carried out. Further, since the slow response speed is set for the data recording, the signal changes caused by the scratch or the like on the optical disk 15 does not affect the operation of the optical disk device 20. Accordingly, it is possible to detect the wobble signal having high accuracy and stability.

According to the optical disk device of the embodiment on the present invention, when the optical disk device 20 records information on the optical disk 15, the wobble signal detection circuit 30 can detect the wobble signal of the plural types of the optical disks in high accuracy. As a result, the reliable and stable recording can be performed on the plural types of the optical disks.

In the embodiment of the present invention, the amplitude adjustment circuits 64a and 64b adjusts the signals output from the space sample circuits 51a and 51b. However, so long as the levels of the signal output from the space sample circuits 51a and 51b are larger than a predetermined value, the amplitude adjustment circuits 64a and 64b may be eliminated.

According to the embodiment of the present invention, the AC combining circuits 51a and 51b, and the DC component removing circuits 66a and 66b remove the DC component. However, when the average voltage of the signal input to the arithmetic circuit 90 is not largely different from the reference voltage, the AC combining circuits 53a and 53b, and the DC combining circuits 66a and 66b may be omitted.

Furthermore, in the embodiment of the present invention, the CPU 40 controls the constant voltage AGCs 57a and 57b so that the target voltage setting circuits 72a and 72b can set the target voltages both at the time of recording and at the time of reproducing that are different from each other. However, when a predetermined level of the signal can be obtained, the target voltage setting circuits 72a and 72b may be omitted even if the obtained voltage during the recording is the same as the obtained voltage during the reproducing.

Further, in the embodiment of the present invention, the constant voltage AGCs 57a and 57b include both the target voltage setting circuits 72a and 72b, and the speed setting circuits 73a and 73b, respectively. However, the present invention is not limited to this, and the constant voltage AGCs 57a and 57b may include either the target voltage setting circuits 72a and 72b or the speed setting circuits 73a and 73b. In the embodiment, the constant amplitude AGCs 57a' and 57b' includes both the target amplitude setting circuits 72a' and 72b', and the speed setting circuits 73a' and 73b', respectively. However, the present invention is not limited to this, and the constant amplitude AGCs 57a' and 57b' may include either the target amplitude setting circuits 72a' and 72b' or the speed setting circuits 73a' and 73b'.

Furthermore, in the embodiment of the present invention, in accordance with the type of the optical disk, either the first signal extraction circuit 30a or the second signal extraction circuit 30b is selected. However, the present invention is not limited to this, the optical disk device 20 may include three or more types of signal extraction circuits, and one of them may be selected. Alternatively, the optical disk device 20 may include only the first signal extraction circuit 30a. In this case, the circuit selector 61 is not necessary, and the wobble signal is detected by the first signal extraction circuit 30a.

Furthermore, according to the embodiment of the present invention, the optical disk device 20 includes the circuit for detecting the wobble signal included in the signal only at the time of forming the space region, and the circuit for detecting the wobble signals included in the signals both at the time of forming the space region and at the time of forming the mark region. However, the present invention is not limited to this, and the optical disk device 20 may include either of these circuits. When the wobble signal is to be detected from the signal only at the time of forming the space region, the first signal extraction circuit 30a may include the space sample circuits 51a and 51b, the amplitude adjustment circuits 64a and 64b, the constant voltage AGC 57a and 57b, and second subtracting unit 58a. On the other hand, when the wobble signal is to be detected from the signal both at the time of forming the space region and at the time of forming the mark region, and the switching between the signal generated at the time of forming the space region and the signal generated at the time of forming the mark region is carried out, the third adder 54c may be eliminated from the first signal extraction circuit 30a. Further, when signal switching is not performed between signal generated at the time of forming the space region and the signal generated at the time of forming the mark region, the switching unit 55a may be omitted from the first signal extraction circuit 30a.

According to the embodiment of the present invention, the optical disk device 20 includes the circuit for detecting the wobble signal based on the difference the signal formed by adding the signal S2a and the signal S3a and the signal formed by adding the signal S2b and the signal S3b, and includes the circuit for detecting the wobble signal based on the signal formed by adding the signal obtained by subtracting the signal S2b from the signal S2a and the signal obtained by subtracting the signal S3b from the signal S3a, when the wobble signal is detected from the signals both at the time of forming the space region and at the time of forming the mark region. However, the present invention is not limited to this, and the optical disk device 20 may includes either of these circuits.

In the embodiment of the present invention, the space sample circuits 51a and 51b extract the signal components from the signals Sc and Sd provided from the optical pickup unit 23 at the time of forming the space region. However, the present invention is not limited to this, and instead of the space sample circuits 51a and 51b, a sampling-and-holding circuit may be used for extracting the signal components at the time of forming the space region.

In the above-described embodiment, the DVD is used as the optical disk 15 as one example. However, the present invention is not limited to this, and any optical recording medium on which the wobble signal is recorded may be used as the optical disk 15.

In the above-described embodiment, the ADIP information is extracted from the wobble signal. However, the present invention is not limited to this, and for example, in the case of a compact disk (CD), ATIP (Absolute Time In Pregroove) may be extracted from the wobble signal.

In the above-described embodiment, the amplitude adjustment circuits 64a and 64b select either of two gains based on the instruction provided from the CPU 40. However, the present invention is not limited to this, and the amplitude adjustment circuits 64a and 64b may select one gain from three or more gains. Furthermore, the gains need not be predetermined, and the CPU 40 may set an arbitrary value of the gain.

According to the embodiment of the present invention, the optical disk device 20 may be incorporated in the case shared by the host device, or may be disposed in the case that is not the same as the case of the host device. In other words, the optical disk device my be incorporated in the host device, or be disposed outside the host device.

According to the present invention, the wobble signal detection circuit may be applied to a plurality of types of optical recording media. With this wobble signal detection circuit, it is possible to detect the wobble signal having accuracy and stability at least at the time of the recording operation.

According to the present invention, the optical disk device may be applied to a plurality of types of recording media, and can perform the recording with good quality and reliability. According to the present invention, the first sample circuit may correspond to the first space sample circuit 51a of the embodiment, and the second sample circuit may correspond to the second sample circuit 51b of the embodiment. The first voltage adjustment circuit may correspond to the first constant voltage AGC 57a of the embodiment, and the second voltage adjustment circuit may correspond to the second constant voltage AGC 57b of the embodiment. The Subtracting circuit may correspond to the second subtracting unit 58a, and the first and second signal adjustment circuits may correspond to the amplitude adjustment circuits 64a and 64b. The first amplifying circuit may correspond to the amplifier 65a, and the second amplifying circuit may correspond to the amplifier 65b. The first adding circuit may correspond to the first adder 54a, the second adding circuit may correspond to the second adder 54b. The first subtracting circuit may correspond to the third subtracting unit 58b, and the second subtracting circuit may correspond to the fourth subtracting unit 58c. The adding circuit may correspond to the third adder 54c, and the signal switching circuit may correspond to the switching unit 55a. The first to fourth DC component removing circuits may correspond to the DC component removing circuits 66a and 66b, and the first and second AC combining circuits 53a and 53b. The selecting circuit may correspond to the circuit selector 61. The first amplitude adjustment circuit may correspond to the third constant amplitude AGC 57a', and the second amplitude adjustment circuit may correspond to the fourth constant amplitude AGC 57b'. The arithmetic processing circuit may correspond to the arithmetic circuit 90.

In this specification, the recording medium includes any recording medium on which additional information is recorded as a wobble signal as well as the CD, DVD, and the like.

Further, in this specification, the sample circuit includes not only the circuit for sampling a signal at a predetermined timing but also a circuit for sampling and holding a signal.

This patent application is based on Japanese priority patent application No. 2001-374057 filed on Dec. 7, 2001, the entire contents of which are hereby incorporated by reference.

What is claimed is:

1. A wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection circuit comprising:

a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;

a first voltage adjustment circuit for adjusting a signal level of the sampled first voltage signal so that an average voltage of the adjusted first voltage signal output from the first sample circuit can be equal to a first target voltage;

a second sample circuit for, in sync with the specific control signal, sampling a second voltage signal corresponding to an electric signal converted from a light signal being based on the reflected light received by the second light receiving element;

a second voltage adjustment circuit for adjusting a signal level of the sampled second voltage signal so that an average voltage of the adjusted second voltage signal output from the second sample circuit can be equal to the first target voltage; and a subtracting circuit for outputting a wobble signal that is a difference in level between the first voltage signal adjusted and output by the first voltage adjustment circuit and the second voltage signal adjusted and output by the second voltage adjustment circuit.

2. The wobble signal detection circuit according to claim 1, further comprising:

a first signal adjustment circuit provided at an upstream side of the first voltage adjustment circuit for adjusting an amplitude of the sampled first voltage signal, wherein a gain used in the amplitude adjustment during a recording operation is different from a gain used in the amplitude adjustment during a reproducing operation; and a second signal adjustment circuit provided at an upstream side of the second voltage adjustment circuit for adjusting an amplitude of the sampled second voltage signal, wherein the gain used in the amplitude adjustment during the recording operation is different from the gain used in the amplitude adjustment during the reproducing operation.

3. The wobble signal detection circuit according to claim 1, further comprising:

a target voltage setting circuit for setting the first target voltage and a second target voltage achieved by the first voltage adjustment circuit so that the first target voltage set for during the recording operation can be different from the second target voltage set for during a reproducing operation, and setting the first and second target voltages achieved by the second voltage adjustment circuit so that the first target voltage set for during the recording operation can be different from the second target voltage set for during the reproducing operation.

4. The wobble signal detection circuit according to claim 1, further comprising:

a speed setting circuit for setting first and second response speeds of the first voltage adjustment circuit to the sampled first voltage signal input thereto so that the first response speed immediately after switching between a recording operation and a reproducing operation is performed is larger than the second response speed during the recording operation; and setting the first and second response speed of the second voltage adjustment circuit to the sampled second voltage signal input thereto so that the first response speed set for immediately after switching between the recording operation and the reproducing operation is performed is larger than the second response speed set for during the recording operation.

5. A wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection circuit comprising:

a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;

a first amplifying circuit for amplifying an amplitude of the sampled first voltage signal output from the first sample circuit, and outputting the amplified first voltage signal;

a second sample circuit for, in sync with the specific control signal, sampling a second voltage signal corresponding to an electric signal converted from a light signal being based on the reflected light received by the second light receiving element;

a second amplifying circuit for amplifying the sampled second voltage signal output from the second sample circuit, and outputting the amplified second voltage signal; and an arithmetic processing circuit for receiving the amplified first voltage signal output by the first amplifying circuit, the amplified second voltage signal output by the second amplifying circuit, the first voltage signal output by the first light receiving element, and the second voltage signal output by the second light receiving circuit, and for performing an arithmetic process on the received signals so as to output the wobble signal.

6. The wobble signal detection circuit according to claim 5, wherein the arithmetic processing circuit comprises:

a first adding circuit for adding the amplified first voltage signal output by the first amplifying circuit and the first voltage signal provided from the first light receiving element, and outputting the added signal;

a second adding circuit for adding the amplified second voltage signal output by the second amplifying circuit and the second voltage signal provided from the second light receiving element, and outputting the added signal; and a subtracting circuit for outputting the wobble signal that is a difference in level between the added signal output by the first adding circuit and the added signal output by the second adding circuit.

7. The wobble signal detection circuit according to claim 5, wherein the arithmetic processing circuit comprises:

a first subtracting circuit for outputting a subtracted signal that is a difference in level between the amplified first voltage signal output by the first amplifying circuit and the amplified second voltage signal output by the second amplifying circuit;

a second subtracting circuit for outputting a subtracted signal that is a difference in level between the first voltage signal provided from the first light receiving element and the second voltage signal provided from the second light receiving element; and an adding circuit for adding the subtracted signal output by the first subtracting circuit and the subtracted signal output by the second subtracting circuit so as to output the added signal as the wobble signal.

8. The wobble signal detection circuit according to claim 5, wherein the arithmetic processing circuit comprises:
a first subtracting circuit for outputting a subtracted signal that is a difference in level between the amplified first voltage signal output by the first amplifying circuit and the amplified second voltage signal output by the second amplifying circuit;
a second subtracting circuit for outputting a subtracted signal that is a difference in level between the first voltage signal provided from the first light receiving element and the second voltage signal provided from the second light receiving element;
a signal switching circuit for, in sync with the specific control signal, selecting the subtracted signal output by the first subtracting circuit during a period for forming the space region, and selecting the subtracted signal output by the second subtracting circuit during a period for forming a mark region so as to output the selected signal as the wobble signal.

9. The wobble signal detection circuit according to claim 5, further comprising a first DC component removing circuit provided at an upstream side of the arithmetic processing circuit for removing a DC component from the amplified first voltage signal to be received by the arithmetic processing circuit, a second DC component removing circuit provided at an upstream side of the arithmetic processing circuit for removing a DC component from the amplified second voltage signal to be received by the arithmetic processing circuit, a third DC component removing circuit provided at an upstream side of the arithmetic processing circuit for removing a DC component from the first voltage signal that is provided from the first light receiving element and is to be received by the arithmetic processing circuit, and a fourth DC component removing circuit provided at an upstream side of the arithmetic processing circuit for removing a DC component from the second voltage signal that is provided from the second light receiving element and is to be received by the arithmetic processing circuit.

10. A wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection circuit comprising:
a first amplitude adjustment circuit for adjusting an amplitude of a first voltage signal so that the amplitude of the first voltage signal can be equal to a target amplitude, wherein the first voltage signal corresponds to an electric signal converted from a light signal being based on the reflected light received by the first light receiving element, and outputting the adjusted first voltage signal;
a second amplitude adjustment circuit for adjusting an amplitude of a second voltage signal so that the amplitude of the second voltage signal can be equal to the target amplitude, wherein the second voltage signal corresponds to an electric signal converted from a light signal being based on the reflected light received by the second light receiving element, and outputting the adjusted second voltage signal;
a target amplitude setting circuit for setting the target amplitude achieved by the first amplitude adjustment circuit, and the target amplitude achieved by the second amplitude adjustment circuit; and
a subtracting circuit for outputting the wobble signal that is a difference in level between the adjusted first voltage signal output by the first amplitude adjustment circuit and the adjusted second voltage signal output by the second amplitude adjustment circuit.

11. A wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection circuit comprising:
a first amplitude adjustment circuit for adjusting an amplitude of a first voltage signal corresponding to an electric signal converted from a light signal being based on the reflected light received by the first light receiving element, and outputting the adjusted first voltage signal;
a second amplitude adjustment circuit for adjusting an amplitude of a second voltage signal corresponding to an electric signal converted from a light signal being based on the reflected light received by the second light receiving element, and outputting the adjusted second voltage signal; and
a speed setting circuit for setting first and second response speeds of the first amplitude adjustment circuit to the first voltage signal input thereto, and the first and second response speeds of the second amplitude adjustment circuit to the second voltage signal input thereto so that the first response speed set for immediately after switching between a recording operation and a reproducing operation is performed is larger than the second response speed set for during the recording operation.

12. The wobble signal detection circuit according to claim 11, further comprising a subtracting circuit for outputting the wobble signal that is a difference in level between the adjusted first voltage signal output by the first amplitude adjustment circuit and the adjusted second voltage signal output by the second amplitude adjustment circuit.

13. The wobble signal detection circuit according to claim 11, wherein the first amplitude adjustment circuit adjusts the amplitude of the first voltage signal so that the adjusted amplitude of the first voltage signal can become a target amplitude, and the second amplitude adjustment circuit adjusts the amplitude of the second voltage signal so that the amplitude of the second voltage signal can become the target amplitude.

14. A wobble signal detection unit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection unit comprising a first wobble signal detection circuit and a second wobble signal detection circuit,
wherein the first wobble signal detection circuit includes:
a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;
a first voltage adjustment circuit for adjusting a signal level of the sampled first voltage signal so that an average voltage of the adjusted first voltage signal output from the first sample circuit can be equal to a first target voltage;

a second sample circuit for, in sync with the specific control signal, sampling a second voltage signal corresponding to an electric signal converted from a light signal being based on the reflected light received by the second light receiving element;

a second voltage adjustment circuit for adjusting a signal level of the sampled second voltage signal so that an average voltage of the adjusted second voltage signal output from the second sample circuit can be equal to the first target voltage; and a subtracting circuit for outputting a wobble signal that is a difference in level between the first voltage signal adjusted and output by the first voltage adjustment circuit and the second voltage signal adjusted and output by the second voltage adjustment circuit, wherein the second wobble signal detection circuit includes:

a first sample circuit for, in sync with a specific control signal, sampling the first voltage signal corresponding to the electric signal converted from the light signal being based on the reflected light received by the first light receiving element, wherein the specific control signal is specific to the period for forming a space region when recording information on the optical recording medium;

a first amplifying circuit for amplifying an amplitude of the sampled first voltage signal output from the first sample circuit, and outputting the amplified first voltage signal;

a second sample circuit for, in sync with the specific control signal, sampling the second voltage signal corresponding to the electric signal converted from the light signal being based on the reflected light received by the second light receiving element;

a second amplifying circuit for amplifying the sampled second voltage signal output from the second sample circuit, and outputting the amplified second voltage signal; and an arithmetic processing circuit for receiving the amplified first voltage signal output by the first amplifying circuit, the amplified second voltage signal output by the second amplifying circuit, the first voltage signal output by the first light receiving element, and the second voltage signal output by the second light receiving circuit, and for performing an arithmetic process on the received signals so as to output the wobble signal, and wherein the wobble signal detection unit further comprises a selecting circuit for selecting either the first wobble signal detection circuit or the second wobble signal detection circuit, based on a signal indicating a type of the optical recording medium.

15. The wobble signal detection unit according to claim 14, wherein the first wobble signal detection circuit further includes:

a first signal adjustment circuit provided at an upstream side of the first voltage adjustment circuit for adjusting an amplitude of the sampled first voltage signal, wherein a gain used in the amplitude adjustment during a recording operation is different from a gain used in the amplitude adjustment during a reproducing operation; and a second signal adjustment circuit provided at an upstream side of the second voltage adjustment circuit for adjusting an amplitude of the sampled second voltage signal, wherein the gain used in the amplitude adjustment during the recording operation is different from the gain used in the amplitude adjustment during the reproducing operation.

16. The wobble signal detection unit according to claim 14, wherein the first wobble signal detection circuit further includes:

a target voltage setting circuit for setting the first target voltage and a second target voltage achieved by the first voltage adjustment circuit so that the first target voltage set for during the recording operation can be different from the second target voltage set for during a reproducing operation, and setting the first and second target voltages achieved by the second voltage adjustment circuit so that the first target voltage set for during the recording operation can be different from the second target voltage set for during the reproducing operation.

17. The wobble signal detection unit according to claim 14, wherein the arithmetic processing circuit of the second wobble signal detection circuit includes:

a first adding circuit for adding the amplified first voltage signal output by the first amplifying circuit and the first voltage signal provided from the first light receiving element, and outputting the added signal;

a second adding circuit for adding the amplified second voltage signal output by the second amplifying circuit and the second voltage signal provided from the second light receiving element, and outputting the added signal; and a subtracting circuit for outputting the wobble signal that is a difference in level between the added signal output by the first adding circuit and the added signal output by the second adding circuit.

18. The wobble signal detection unit according to claim 14, wherein the arithmetic processing circuit of the second wobble signal detection circuit includes:

a first subtracting circuit for outputting a subtracted signal that is a difference in level between the amplified first voltage signal output by the first amplifying circuit and the amplified second voltage signal output by the second amplifying circuit;

a second subtracting circuit for outputting a subtracted signal that is a difference in level between the first voltage signal provided from the first light receiving element and the second voltage signal provided from the second light receiving element; and an adding circuit for adding the subtracted signal output by the first subtracting circuit and the subtracted signal output by the second subtracting circuit so as to output the added signal as the wobble signal.

19. The wobble signal detection unit according to claim 14, wherein the arithmetic processing circuit of the second wobble signal detection circuit includes:

a first subtracting circuit for outputting a subtracted signal that is a difference in level between the amplified first voltage signal output by the first amplifying circuit and the amplified second voltage signal output by the second amplifying circuit;

a second subtracting circuit for outputting a subtracted signal that is a difference in level between the first voltage signal provided from the first light receiving element and the second voltage signal provided from the second light receiving element;

a signal switching circuit for, in sync with the specific control signal, selecting the subtracted signal output by the first subtracting circuit during a period for forming the space region, and selecting the subtracted signal output by the second subtracting circuit during a period for forming a mark region so as to output the selected signal as the wobble signal.

20. A wobble signal detection unit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium, the wobble signal detection unit comprising a first wobble signal detection circuit and a second wobble signal detection circuit, wherein the first wobble signal detection circuit includes:

a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;

a first voltage adjustment circuit for adjusting a signal level of the sampled first voltage signal so that an average voltage of the adjusted first voltage signal output from the first sample circuit can be equal to a first target voltage;

a second sample circuit for, in sync with the specific control signal, sampling a second voltage signal corresponding to an electric signal converted from a light signal being based on the reflected light received by the second light receiving element;

a second voltage adjustment circuit for adjusting a signal level of the sampled second voltage signal so that an average voltage of the adjusted second voltage signal output from the second sample circuit can be equal to the first target voltage; and a subtracting circuit for outputting a wobble signal that is a difference in level between the first voltage signal adjusted and output by the first voltage adjustment circuit and the second voltage signal adjusted and output by the second voltage adjustment circuit, wherein the second wobble signal detection circuit includes:

a first amplitude adjustment circuit for adjusting an amplitude of the first voltage signal so that the amplitude of the first voltage signal can be equal to a target amplitude, wherein the first voltage signal corresponds to the electric signal converted from the light signal being based on the reflected light received by the first light receiving element, and outputting the adjusted first voltage signal;

a second amplitude adjustment circuit for adjusting an amplitude of the second voltage signal so that the amplitude of the second voltage signal can be equal to the target amplitude, wherein the second voltage signal corresponds to the electric signal converted from the light signal being based on the reflected light received by the second light receiving element, and outputting the adjusted second voltage signal;

a target amplitude setting circuit for setting the target amplitude achieved by the first amplitude adjustment circuit, and the target amplitude achieved by the second amplitude adjustment circuit; and a subtracting circuit for outputting the wobble signal that is a difference in level between the adjusted first voltage signal output by the first amplitude adjustment circuit and the adjusted second voltage signal output by the second amplitude adjustment circuit, and wherein the wobble signal detection unit further comprises a selecting circuit for selecting either the first wobble signal detection circuit or the second wobble signal detection circuit, based on a signal indicating a type of the optical recording medium.

21. An optical disk device that records information on the optical recording medium, comprising:

a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium; and a processing unit for performing a recording operation by using the wobble signal detected by the wobble signal detection circuit, wherein the wobble signal detection circuit comprising:

a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;

a first voltage adjustment circuit for adjusting a signal level of the sampled first voltage signal so that an average voltage of the adjusted first voltage signal output from the first sample circuit can be equal to a first target voltage;

a second sample circuit for, in sync with the specific control signal, sampling a second voltage signal corresponding to an electric signal converted from a light signal being based on the reflected light received by the second light receiving element;

a second voltage adjustment circuit for adjusting a signal level of the sampled second voltage signal so that an average voltage of the adjusted second voltage signal output from the second sample circuit can be equal to the first target voltage; and a subtracting circuit for outputting a wobble signal that is a difference in level between the first voltage signal adjusted and output by the first voltage adjustment circuit and the second voltage signal adjusted and output by the second voltage adjustment circuit.

22. An optical disk device that records information on the optical recording medium, comprising:

a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium; and a processing unit for performing a recording operation by using the wobble signal detected by the wobble signal detection circuit, wherein the wobble signal detection circuit comprises:

a first sample circuit for, in sync with a specific control signal, sampling a first voltage signal corresponding to an electric signal converted from a light signal being based on the reflected light received by the first light receiving element, wherein the specific control signal is specific to a period for forming a space region when recording information on the optical recording medium;

a first amplifying circuit for amplifying an amplitude of the sampled first voltage signal output from the first sample circuit, and outputting the amplified first voltage signal;

a second sample circuit for, in sync with the specific control signal, sampling a second voltage signal corresponding to an electric signal converted from a light signal being based on the reflected light received by the second light receiving element;

a second amplifying circuit for amplifying the sampled second voltage signal output from the second sample circuit, and outputting the amplified second voltage signal; and an arithmetic processing circuit for receiving the amplified first voltage signal output by the first amplifying circuit, the amplified second voltage signal output by the second amplifying circuit, the first voltage signal output by the first light receiving element, and the second voltage signal output by the second light receiving circuit, and for performing an arithmetic process on the received signals so as to output the wobble signal.

23. An optical disk device that records information on the optical recording medium, comprising:

a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium; and a processing unit for performing a recording operation by using the wobble signal detected by the wobble signal detection circuit, wherein the wobble signal detection circuit comprises:

a first amplitude adjustment circuit for adjusting an amplitude of a first voltage signal so that the amplitude of the first voltage signal can be equal to a target amplitude, wherein the first voltage signal corresponds to an electric signal converted from a light signal being based on the reflected light received by the first light receiving element, and outputting the adjusted first voltage signal;

a second amplitude adjustment circuit for adjusting an amplitude of a second voltage signal so that the amplitude of the second voltage signal can be equal to the target amplitude, wherein the second voltage signal corresponds to an electric signal converted from a light signal being based on the reflected light received by the second light receiving element, and outputting the adjusted second voltage signal;

a target amplitude setting circuit for setting the target amplitude achieved by the first amplitude adjustment circuit, and the target amplitude achieved by the second amplitude adjustment circuit; and a subtracting circuit for outputting the wobble signal that is a difference in level between the adjusted first voltage signal output by the first amplitude adjustment circuit and the adjusted second voltage signal output by the second amplitude adjustment circuit.

24. An optical disk device that records information on the optical recording medium, comprising:

a wobble signal detection circuit for detecting a wobble signal based on signals provided from first and second light receiving elements that are divided from each other in a direction tangential to a spiral or concentric recording region of an optical recording medium in which the first and second light receiving elements receive light that is reflected from a surface of the optical recording medium; and a processing unit for performing a recording operation by using the wobble signal detected by the wobble signal detection circuit, wherein the wobble signal detection circuit comprises:

a first amplitude adjustment circuit for adjusting an amplitude of a first voltage signal corresponding to an electric signal converted from a light signal being based on the reflected light received by the first light receiving element, and outputting the adjusted first voltage signal;

a second amplitude adjustment circuit for adjusting an amplitude of a second voltage signal corresponding to an electric signal converted from a light signal being based on the reflected light received by the second light receiving element;

a speed setting circuit for setting first and second response speeds of the first amplitude adjustment circuit to the first voltage signal input thereto, and the first and second response speeds of the second amplitude adjustment circuit to the second voltage signal input thereto so that the first response speed set for immediately after switching between a recording operation and a reproducing operation is performed is larger than the second response speed set for during the recording operation; and a subtracting circuit for outputting the wobble signal that is a difference in level between the adjusted first voltage signal output by the first amplitude adjustment circuit and the adjusted second voltage signal output by the second amplitude adjustment circuit.

* * * * *